United States Patent
Hiramine

(10) Patent No.: US 10,202,102 B2
(45) Date of Patent: Feb. 12, 2019

(54) KEYLESS SYSTEM

(71) Applicant: Mitsubishi Electric Corporation, Tokyo (JP)

(72) Inventor: Masanobu Hiramine, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 15/281,285

(22) Filed: Sep. 30, 2016

(65) Prior Publication Data

US 2017/0342750 A1     Nov. 30, 2017

(30) Foreign Application Priority Data

May 26, 2016   (JP) .................................. 2016-104807

(51) Int. Cl.
 *B60R 25/24*         (2013.01)
 *G07C 9/00*          (2006.01)

(52) U.S. Cl.
 CPC ........ *B60R 25/245* (2013.01); *G07C 9/00309* (2013.01); *G07C 9/00* (2013.01); *G07C 2009/00793* (2013.01); *G07C 2209/63* (2013.01)

(58) Field of Classification Search
 None
 See application file for complete search history.

(56) References Cited

U.S. PATENT DOCUMENTS

2006/0066442 A1* 3/2006 Hamada ................. B60R 25/00 340/10.1
2006/0114100 A1* 6/2006 Ghabra .................. E05B 81/78 340/5.61
2007/0132553 A1   6/2007 Nakashima
2014/0313011 A1* 10/2014 Mimura ............. G07C 9/00309 340/5.64

FOREIGN PATENT DOCUMENTS

| JP | 2007-146440 A | 6/2007 |
| JP | 4022859 B2 | 12/2007 |
| JP | 2011-63961 A | 3/2011 |
| JP | 2013-2111 A | 1/2013 |
| JP | 2014-125750 A | 7/2014 |
| JP | 2014-226942 A | 12/2014 |
| JP | 2016-63257 A | 4/2016 |

OTHER PUBLICATIONS

Communication dated May 23, 2017 from the Japanese Patent Office in counterpart Application No. 2016-104807.

* cited by examiner

*Primary Examiner* — Nay Tun
*Assistant Examiner* — Shawna M Kingston
(74) *Attorney, Agent, or Firm* — Sughrue Mion, PLLC; Richard C. Turner

(57) ABSTRACT

In a keyless system including a car-mounted device and a portable device carried by a user, the portable device detects the static state of the portable device for an arbitrarily set time period or longer with a static action detection section, and transmits a response signal serving as a response to a challenge signal transmitted from the car-mounted device on condition that the static state has been detected by the static action detection section. This can allow vehicle control such as locking and unlocking of a door of a vehicle through a simple action not requiring operation with a user's hand, and can prevent unnecessary vehicle control not intended by the user.

19 Claims, 17 Drawing Sheets

KEYLESS SYSTEM

BACKGROUND OF THE INVENTION

Field of the Invention

The present invention relates to a keyless system for performing vehicle control including locking and unlocking of a door of a vehicle, opening and closing of a slide door, and turn-on of an interior light through communication for authentication between a portable device and a car-mounted device.

Description of the Related Art

Conventionally known automobile communication systems for enhancing the convenience of automobiles include a keyless system for allowing vehicle control including locking and unlocking of a door, opening and closing of a slide door, and turn-on of an interior light by a user carrying a portable device and operating a switch provided for a door knob of a vehicle or touching a touch sensor with his finger.

Such a keyless system involves communicating a challenge signal in an LF band and a resulting response signal in a UHF band between a car-mounted device and a portable device carried by a user to identify and authenticate the portable device to process communication data, and achieves enhanced convenience as compared with operation for door opening and closing using a conventional mechanical key or operation of buttons using a wireless key.

In the system as described above, however, in a situation where it is difficult to operate the switch or the touch sensor such as when a user carries baggage in both hands or cannot find the location of a door knob in a dark place, the user cannot enjoy sufficient convenience. This produces the need for a hands-free function which does not require any operation using a user s hand, and various proposals thereof have been made.

Patent Literature 1 has proposed a door lock control apparatus equipped with an automatic lock function of automatically locking a door of a vehicle when a user carrying a portable device moves away from the vehicle to a distance where close-range LF communication is not established or to a distance where medium- to long-range UHF communication is not established. Although the related art is directed only to the locking operation, it is easily conceivable that the related art may be extended to unlocking operation on condition that the user enters the LF communication range of the vehicle and communication is established.

Patent Literature 2 has proposed a slide door opening/closing apparatus provided with a human detection unit for detecting the presence or absence of a user near a vehicle and an action detection unit for detecting a predefined action with a user's foot or the like. The related art eliminates the need for any operation with a user's hand and allows opening and closing of a slide door with fewer erroneous operations even when both hands of the user are full.

CITATION LIST

Patent Literature

PTL 1: Japanese Patent No. 4,022,859
PTL 2: JP-A-2014-125750

When the door lock control apparatus proposed in Patent Literature 1 is extended and applied to the unlock control, however, a problem arises in which communication for authentication is established merely by a user approaching the vehicle to perform the vehicle control even when the user has no intention thereof. In particular, the unintentional unlocking operation leads to a lower level of security and thus needs to be prevented.

Since Patent Literature 1 involves the communication for authentication performed between the portable device and the car-mounted device, the car-mounted device employs a communication sequence in which it always transmits a challenge signal in an LF hand. This results in a problem of fast drain of a battery on the vehicle or a battery on the portable device and a problem of radio interference with the communication between other vehicles.

In the keyless system provided with the slide door opening/closing apparatus presented in Patent Literature 2, the automatic opening and closing of the slide door requires an ultrasonic sensor or an infrared sensor serving as the human detection unit and a motion sensor serving as the action detection unit to be installed at a plurality of points such as close to left and right doors of the vehicle, which leads to a problem of an increased number of parts to cause high cost.

SUMMARY OF THE INVENTION

The present invention has been made in view of the above problems, and it is an object thereof to provide a keyless system allowing vehicle control such as locking and unlocking of a door of a vehicle through a simple action not requiring operation with a user's hand, and achieving low cost, reduced power consumption, and enhanced convenience.

According to an aspect, the present invention provides a keyless system including a car-mounted device mounted on a vehicle and a portable device carried by a user, the keyless system configured to perform communication for authentication such that the car-mounted device transmits a challenge signal and the portable device transmits back a response signal thereto, the car-mounted device configured to perform vehicle control including locking and unlocking of a door of the vehicle when the portable device is authenticated in the communication for authentication, wherein the car-mounted device includes a first close-range communication equipment configured to transmit the challenge signal through a signal in an LF band, a first medium- to long-range communication equipment configured to receive a signal in a UHF band transmitted by the portable device, and a first processor configured to authenticate the portable device based on the response signal received by the first medium- to long-range communication equipment, and the portable device includes a second close-range communication equipment configured to receive the challenge signal transmitted by the first close-range communication equipment, a second medium- to long-range communication equipment configured to transmit at least a response signal through a signal in the UHF band, out of the request signal for requesting the challenge signal from the car-mounted device and the response signal serving as a response to the challenge signal, an action detection section configured to sense and convert vibrations or a change of position of the portable device into an electric signal, a static action detection section configured to detect a static state of the portable device for an arbitrarily set time period or longer based on the electric signal output from the action detection section, and a second processor configured to cause the second medium- to long-range communication equipment to transmit the request signal or the response signal on condition that the static state has been detected by the static action detection section within a predetermined time period.

According to another aspect, the present invention provides a keyless system including a car-mounted device mounted on a vehicle, and a portable information terminal and a portable device both carried by a user, the keyless system configured to perform communication for authentication such that the car-mounted device transmits a challenge signal and the portable device transmits back a response signal thereto, the car-mounted device configured to perform vehicle control including locking and unlocking of a door of the vehicle when the portable device is authenticated in the communication for authentication, wherein the car-mounted device includes a first close-range communication equipment configured to transmit the challenge signal through a signal in an LF band, first medium- to long-range communication equipment configured to receive a signal in a UHF band transmitted by the portable device, and a first processor configured to authenticate the portable device based on the response signal received by the first medium-to long-range communication equipment, the portable information terminal includes a first external device interface configured to perform bidirectional communication with the portable device, an acceleration sensor configured to convert an acceleration produced from a change position of the portable information terminal into an electric signal, and a static action detection section configured to detect a static state of the portable information terminal for an arbitrarily set time period or longer based on an acceleration sensor signal output from the acceleration sensor, and the portable device includes a second external device interface configured to perform bidirectional communication with the portable information terminal, a second close-range communication equipment configured to receive the challenge signal transmitted by the first close-range communication equipment, a second medium- to long-range communication equipment configured to transmit at least the response signal through a signal in the UHF band, out of the request signal for requesting the challenge signal from the car-mounted device and the response signal serving as a response to the challenge signal, and a second processor configured to acquire the result of detection by the static action detection section through the first external device interface and the second external device interface, and to cause the second medium- to long-range communication equipment to transmit the request signal or the response signal on condition that the static state has been detected within a predetermined time period.

According to another aspect, the present invention provides a keyless system including a car-mounted device mounted on a vehicle, and a portable information terminal and a portable device both carried by a user, the keyless system configured to perform communication for authentication such that the car-mounted device transmits a challenge signal and the portable information terminal or the portable device transmits back a response signal thereto, the car-mounted device configured to perform vehicle control including locking and unlocking of a door of the vehicle when the portable device is authenticated in the communication for authentication, wherein the car-mounted device includes a first close-range communication equipment configured to transmit the challenge signal through a signal in an LF band, a third external device interface configured to perform bidirectional medium- to long-range communication with at least the portable information terminal out of the portable device and the portable information terminal and to receive at least the response signal out of a request signal and the response signal through a signal for medium- to long-range communication transmitted by the portable device or the portable information terminal, and a first processor configured to authenticate the portable device based on the response signal received by the third external device interface, the portable information terminal includes a first external device interface configured to perform bidirectional communication with the car-mounted device and the portable device, an acceleration sensor configured to convert an acceleration produced from a change of position of the portable information terminal into an electric signal, and a static action detection section configured to detect a static state of the portable information terminal for an arbitrarily set time period or longer based on an acceleration sensor signal output from the acceleration sensor, and the portable device includes a second external device interface configured to perform bidirectional communication with at least the portable information terminal out of the car-mounted device and the portable information terminal, a second close-range communication equipment configured to receive the challenge signal transmitted by the car-mounted device, and a second processor configured to acquire the result of detection by the static action detection section through the first external device interface and the second external device interface, and to cause the second external device interface or the first external device interface to transmit the request signal for requesting the challenge signal from the car-mounted device or the response signal serving as a response to the challenge signal on condition that the static state has been detected within a predetermined time period.

According to the keyless system of the present invention, the communication for authentication is performed on condition that the static state of the portable device has been detected by the static action detecting section of the portable device carried by the user. This can allow vehicle control such as locking and unlocking of the door of the vehicle through a simple action not requiring operation with a user's hand, and can prevent unnecessary vehicle control not intended by the user.

In addition, the portable information terminal for bidirectional communication with the portable device is provided and the static state is detected by the acceleration sensor and the static action detection section included in the portable information terminal, so that, the portable device can be simplified in configuration and reduced in size. Furthermore, since the high-performance acceleration sensor and a fast CPU can be utilized in the portable information terminal, the static action of the user can be detected with high accuracy.

Since each of the car-mounted device, the portable information terminal, and the portable device is provided with the external device interface, the medium- to long-range communication equipment can be omitted in the car-mounted device the portable device to simplify the configuration and reduce the cost. In addition, the portable information terminal or the portable device can estimate the distance from the car-mounted device based on the status of establishment of bidirectional communication with the car-mounted device or the intensity of a received signal therefrom, and can cause transmission of the request signal when the portable information terminal or the portable device is in the medium- to long-range communication establishment area of the car-mounted device and the static action detection section detects the static state. This can reduce the number of transmissions of ineffective challenge signals by the car-mounted device, thereby reducing power consumption and radio interference with the communication between other vehicles.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing the configuration of a static action detection section of the portable information terminal according to Embodiment 3 of the present invention.

DETAILED DESCRIPTION OF THE PREFERRED EMBODIMENTS

Embodiment 1

Figure 1:
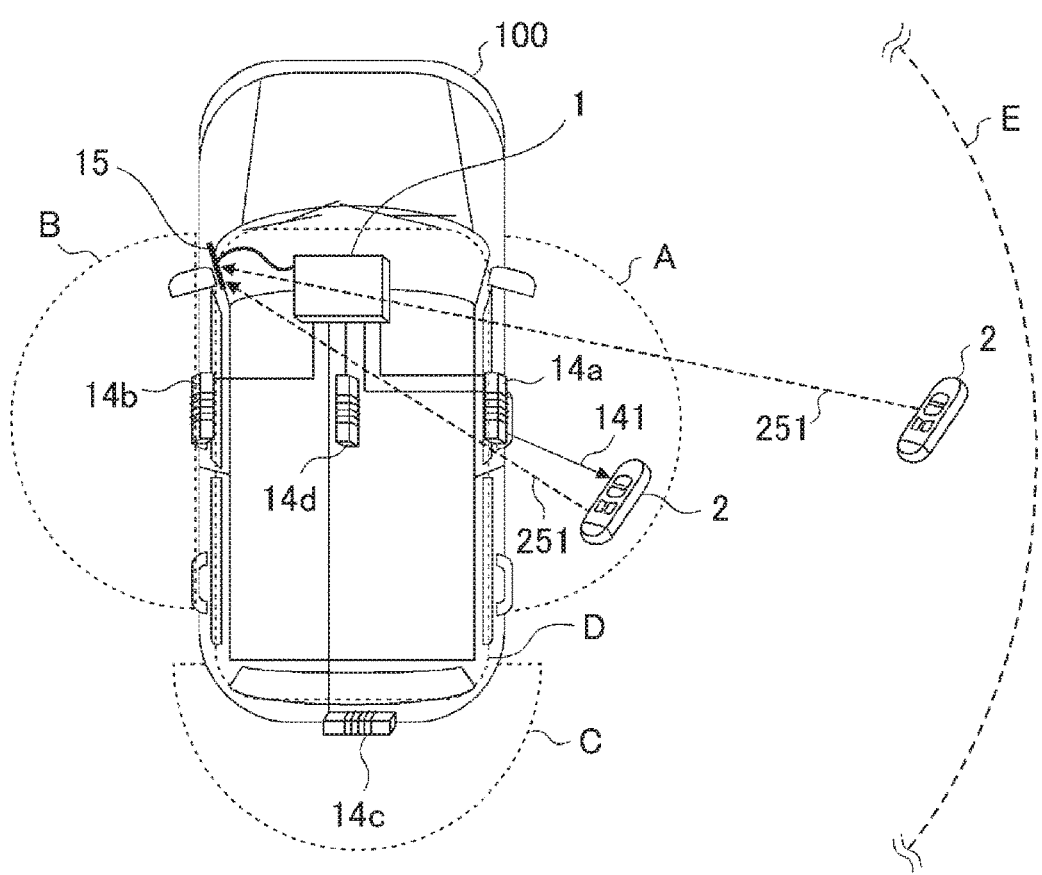
FIG. 1 is a diagram for explaining a layout of a keyless system according to Embodiment 1 of the present invention.
Figure 2:
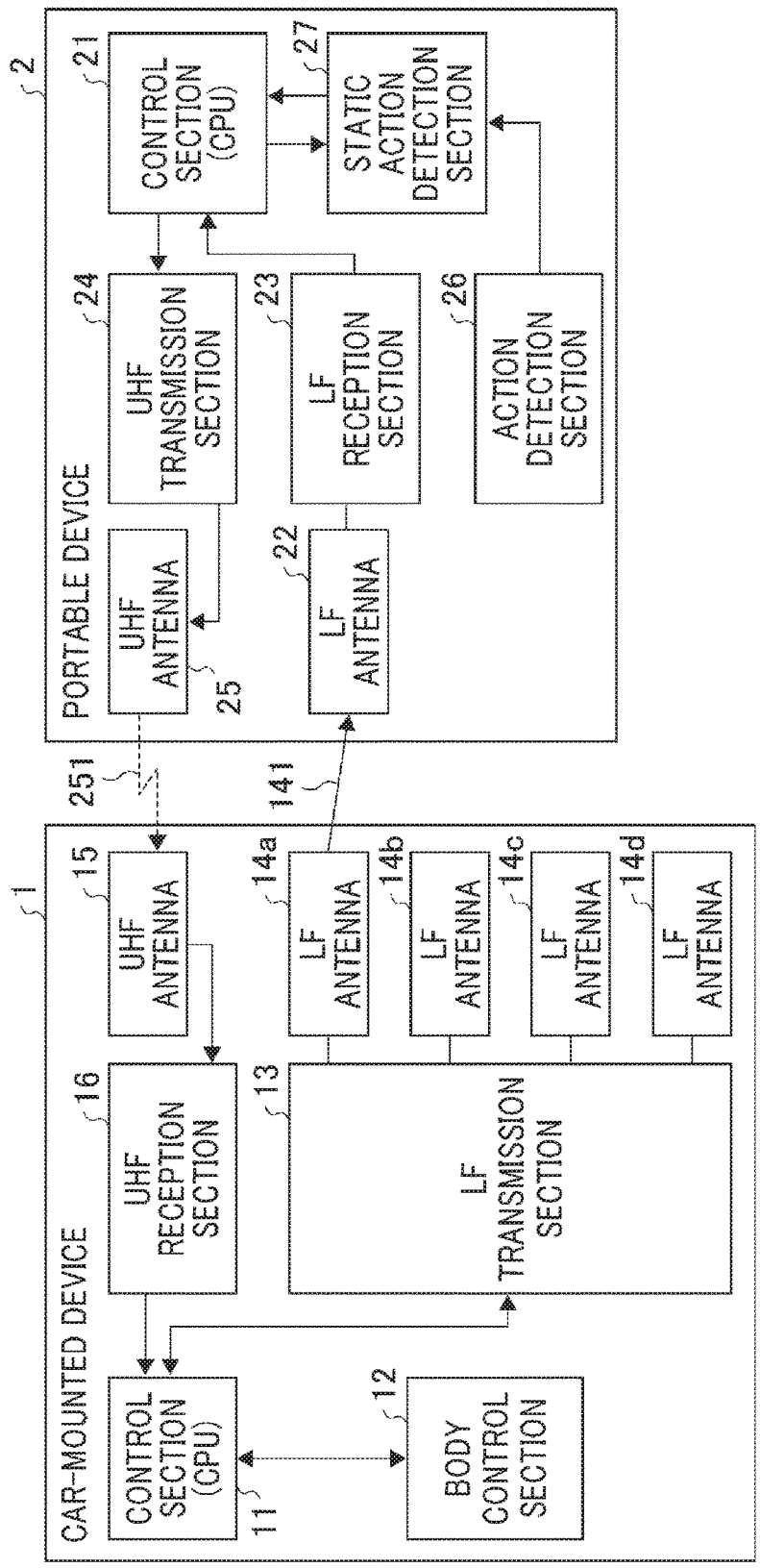
FIG. 2 is a block diagram showing the configurations of a car-mounted device and a portable device in the keyless system according to Embodiment 1 of the present invention.

A keyless system according to Embodiment 1 of the present invention will hereinafter be described with reference to the drawings. FIG. 1 is a diagram showing a representative layout of the keyless system according to Embodiment 1. FIG. 2 is a block diagram showing the configurations of a car-mounted device and a portable device in the keyless system according to Embodiment 1. In the drawings, the identical or corresponding components are designated with the same reference numerals.

The keyless system according to Embodiment 1 of the present invention includes a car-mounted device 1 mounted on a vehicle 100 and a portable device 2 typically carried by a user who is a driver, and performs communication for authentication in which the car-mounted device 1 transmits a challenge signal and the portable device 2 transmits back a response signal. When the authentication of the portable device 2 is performed successfully in the communication for authentication, the car-mounted device 1 performs vehicle control including locking and unlocking of a door of the vehicle 100.

Close-range communication at low frequencies in the LF band is used for the communication from the car-mounted device 1 to the portable device 2. Medium- to long-range communication at high frequencies in the UHF band is used for the communication from the portable device 2 to the car-mounted device 1. When medium- to long-range communication compliant with BLUETOOTH® is used as in Embodiment 2, later described, bidirectional communication is possible between the car-mounted device 1 and the portable device 2.

The vehicle 100 is equipped with, as antennas for the car-mounted device 1, LF antennas 14a, 14b, 14c, and 14d (referred to collectively as LF antenna 14) for transmitting the challenge signal provided by an LF signal 141 and a UHF antenna 15 for receiving at least the response signal out of the response signal and a request signal provided by a UHF signal 251 transmitted from the portable device 2.

The LF antennas 14a, 14b, and 14c are installed on knobs of doors or a trunk and form LF communication establishment areas (indicated by dotted lines A, B, and C in FIG. 1) in which the challenge signal can be communicated to the portable device 2 generally within a range of approximately one meter outside the care. The LF antenna 14d forms an LF communication establishment area (indicated by a dotted line U in FIG. 1) in which the LF challenge signal can be communicated to the portable device 2 throughout the interior of the car.

The UHF communication with the UHF signal 251 is medium- to long-range communication longer than the LF communication and typically covers several tens to several hundreds of meters. In other words, a UHF communication establishment area (indicated by a dotted line E in FIG. 1) corresponds to a range of several tens to several hundreds of meters from the UHF antenna 15 for the car-mounted device 1. The UHF signal 251 transmitted from the portable device 2 within the UHF communication establishment area is received by the UHF antenna 15 and input to the car-mounted device 1.

A switch or an electrostatic sensor (either not shown) is installed for sensing an instruction from a user to start the communication between the car-mounted device 1 and the portable device 2 on a door or a door knob outside the car or inside the car close to the LF antenna 14. Upon activation of the switch, communication for authentication is started between the car-mounted device 1 and the portable device 2 located within the LF communication establishment area outside the car, and when the authentication is successfully performed, vehicle control is performed such as locking or unlocking of a door.

When the switch inside the car is activated to start communication for authentication between the LF antenna 14 and the portable device 2 located in the LF communication establishment area D in the vehicle 100 and the authentication is successfully performed, then vehicle control is performed such as start or stop of an engine. Although FIG. 1 shows the LF antenna 14 for the vehicle 100 consisting of four antennas, the present invention is not limited thereto, and the number of the antennas can be changed depending on the size of the vehicle 100 or the layout of the LF antenna 14.

As shown in FIG. 2, the car-mounted device 1 of the keyless system according to Embodiment 1 is configured to include a control section 11 serving as a first processor, a body control section 12, an LF transmission section 13 and the LF antenna 14 together serving as a first close-range communication equipment, and the UHF antenna 15 and a UHF reception section together serving as a first medium- to long-range communication equipment.

The control section 11 is formed, for example of a CPU responsible for the overall control of the car-mounted device 1 and authenticates the portable device 2 based on the response signal received by the UHF antenna 15. The body control section 12 performs the vehicle control such as locking and unlocking of a door, and start and stop of the engine based on a control signal from the control section 11.

The LF transmission section 13 modulates a challenge signal to be transmitted to the portable device 2. The LF antenna 14 transmits the modulated challenge signal corresponding to the LF signal 141. The UHF antenna 15 receives a response signal corresponding to the UHF signal 251 transmitted from the portable device 2. The UHF reception section 16 demodulates the radio signal.

The portable device 2 is configured to include a control section 21 serving as a second processor, an LF antenna 22 and an LF reception section 23 together serving as a second close-range communication equipment, a UHF transmission section 24 and a UHF antenna 25 together serving as a second medium- to long-range communication equipment, and an action detection section 26 serving as an action detector, and a static action detection section 27 serving as a static action detector for detecting a static action of a user carrying the portable device 2.

The control section 21 is formed, for example of a CPU responsible for the overall control of the portable device 2. The LF antenna 22 receives a challenge signal transmitted from the LF antenna 14 of the car-mounted device 1. The LF reception section 23 demodulates the challenge signal received by the LF antenna 22. The UHF transmission section 24 modulates a response signal serving as a response to the challenge signal. The UHF antenna 25 transmits the modulated response signal.

In the keyless system according to the present invention, the UHF signal 251 transmitted from the portable device 2 to the car-mounted device 1 includes the request signal for requesting the challenge signal from the car-mounted device 1 and the response signal serving as the response to the challenge signal. The portable device 2 according to Embodiment 1 transmits only the response signal.

The action detection section 26 of the portable device 2 is configured to include a vibration sensor, an acceleration sensor or the like, and senses and converts any vibrations or change of position of the portable device 2 into an electric signal. The static action detection section 27 detects a static state of the portable device 2 for an arbitrarily set time period or longer based on the electric signal output from the action detection section 26. The control section 21 causes the UHF transmission section 24 and the UHF antenna 25 to transmit a response signal on condition that the static state has been detected by the static action detection section 27 within a predetermined time period.

Figure 3:
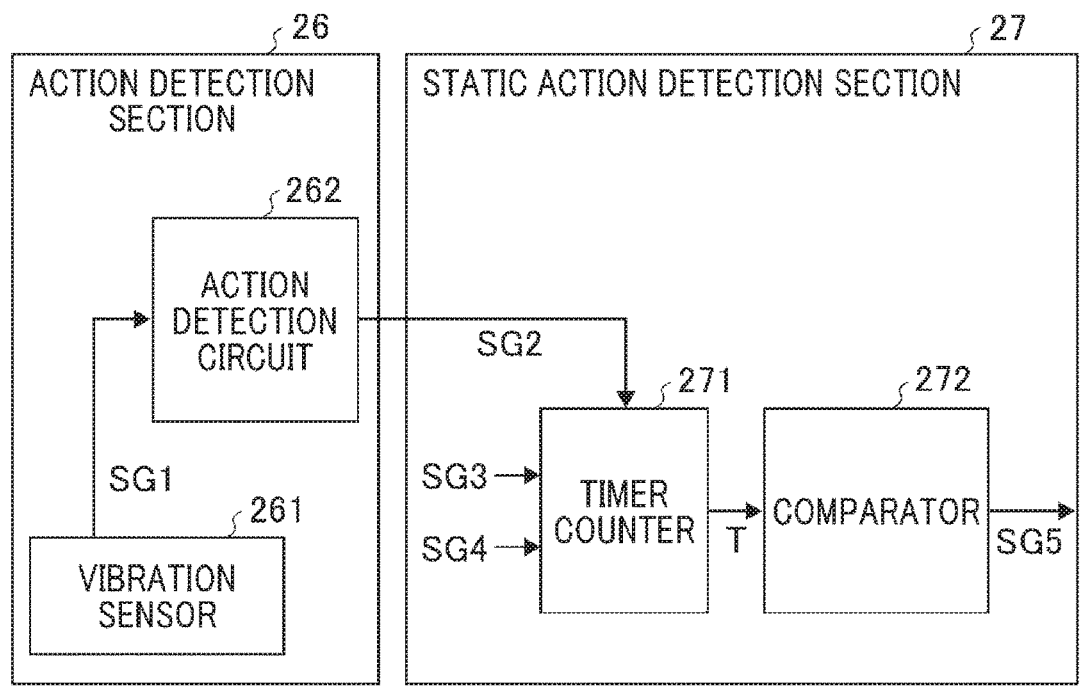
FIG. 3 is a block diagram showing the configurations of an action detection section and a static action detection section of the portable device according to Embodiment 1 of the present invention.
Figure 4:
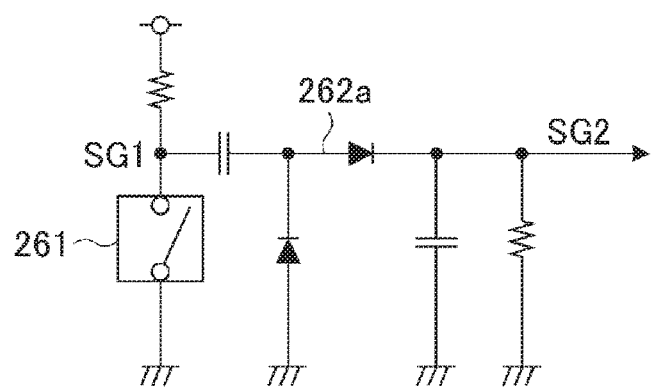
FIG. 4 is a diagram showing an exemplary circuit configuration of the action detection section of the portable device according to Embodiment 1 of the present invention.
Figure 5:
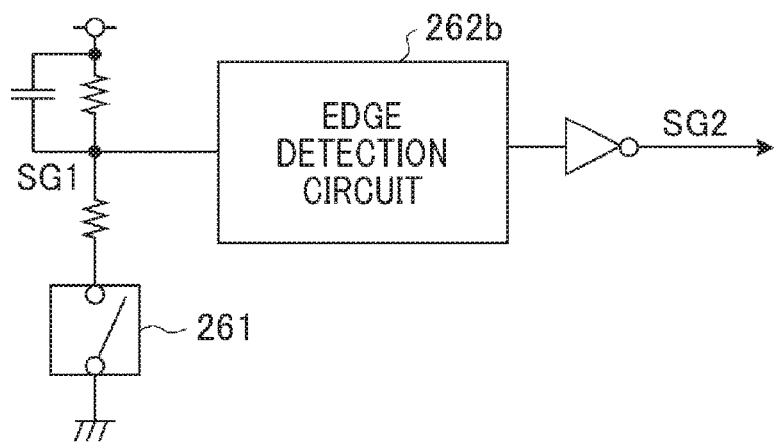
FIG. 5 is a diagram showing another exemplary circuit configuration of the action detection section of the portable device according to Embodiment 1 of the present invention.
Figure 6:
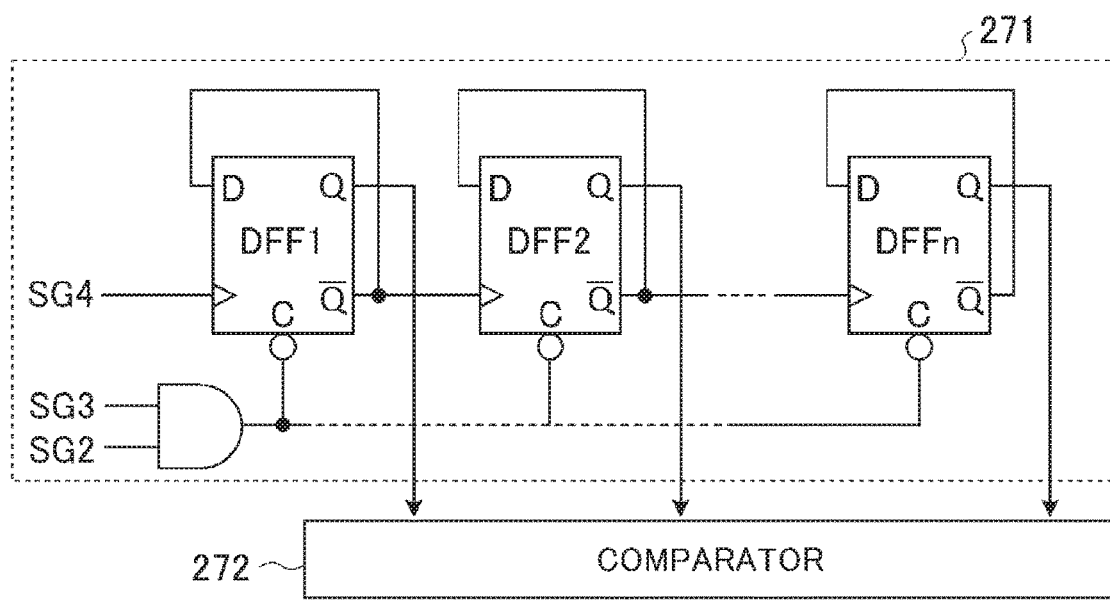
FIG. 6 is a diagram showing an exemplary circuit configuration of the static action detection section of the portable device according to Embodiment 1 of the present invention.

Next, the configurations of the action detection section 26 and the static action detection section 27 of the portable device 2 are described with reference to FIG. 3 to FIG. 6. FIG. 3 is a block diagram showing the configurations of the action detection section and the static action detection section of the portable device. FIGS. 4 and 5 show exemplary circuit configurations of the action detection section. FIG. 6 shows an exemplary circuit configuration of the static action detection section.

As shown in FIG. 3, the action detection section 26 includes a vibration sensor 261 having a switch which changes a signal path between a connection state and a disconnection state in response to vibrations of the portable device 2 and configured to output a vibration sensor signal (switch signal SG1), and an action detection circuit 262 for converting the switch signal SG1 output from the vibration sensor 261 into an action signal SG2 indicating the action state of the portable state 2 before output of the action signal SG2. The action detection circuit 262 outputs the action signal in the action state changing between "High" and "Low."

An action detection circuit 262a shown in FIG. 4 as an exemplary configuration of the action detection circuit 262 is formed of a circuit for filtering and outputting the switch signal SG1 from the vibration sensor 261 which is turned ON and OFF by vibrations. An action detection circuit shown in FIG. 5 is formed of an edge detection circuit 262b for detecting the leading edge and falling edge of the switch signal SG1 from the vibration sensor 261.

The action detection circuit 26 is not limited to one including the vibration sensor 261 and the action detection circuit 262. For example, an acceleration sensor for converting an acceleration produced from changes of position of the portable device 2 into an electric signal may be used such that the movement of the portable device 2 is sensed from the amount of change in the value of an acceleration sensor signal and the acceleration sensor signal is converted into an action signal. How to convert the acceleration sensor signal output from the acceleration sensor into the action signal is described in Embodiment 3, later described.

The static action detection section 27 includes a timer counter 271 serving as a time measurement unit and a comparator 272 serving as a comparison unit for determining whether or not a static time period exceeds the arbitrarily preset time period. As shown in FIG. 6, the timer counter 271 is formed of an asynchronous counter including a plurality of Delay Flip-Flops (DFFs) and has a characteristic of being a circuit of low power consumption.

The timer counter 271 is enabled by a start signal SG3 to start operation, receives input of the action signal SG2 output from the action detection section 26 as a reset signal, and counts pulses of a clock signal SG4 to measure time starting from the point when the reset signal is cleared.

The comparator 272 compares the time measured by the timer counter 271, that is, a counter value T, with a static time parameter value Ts corresponding to the arbitrarily set time period, and when the counter value T exceeds the static time parameter value Ts, determines that the exceeding time period corresponds to a static state, and outputs a static state signal SG5 indicating whether or not the portable device 2 is in a static state. The static state signal SG5 indicates that the user changes from an active state to a static state or from a static state to an active state.

The comparator 272 is formed of a reception apparatus for receiving the counter value T provided by the timer counter 271 and a processing circuit for comparing the arbitrary static time parameter value Ts with the counter value provided by the timer counter 271 and producing the static state signal SG5 based on the comparison result.

Figure 7:
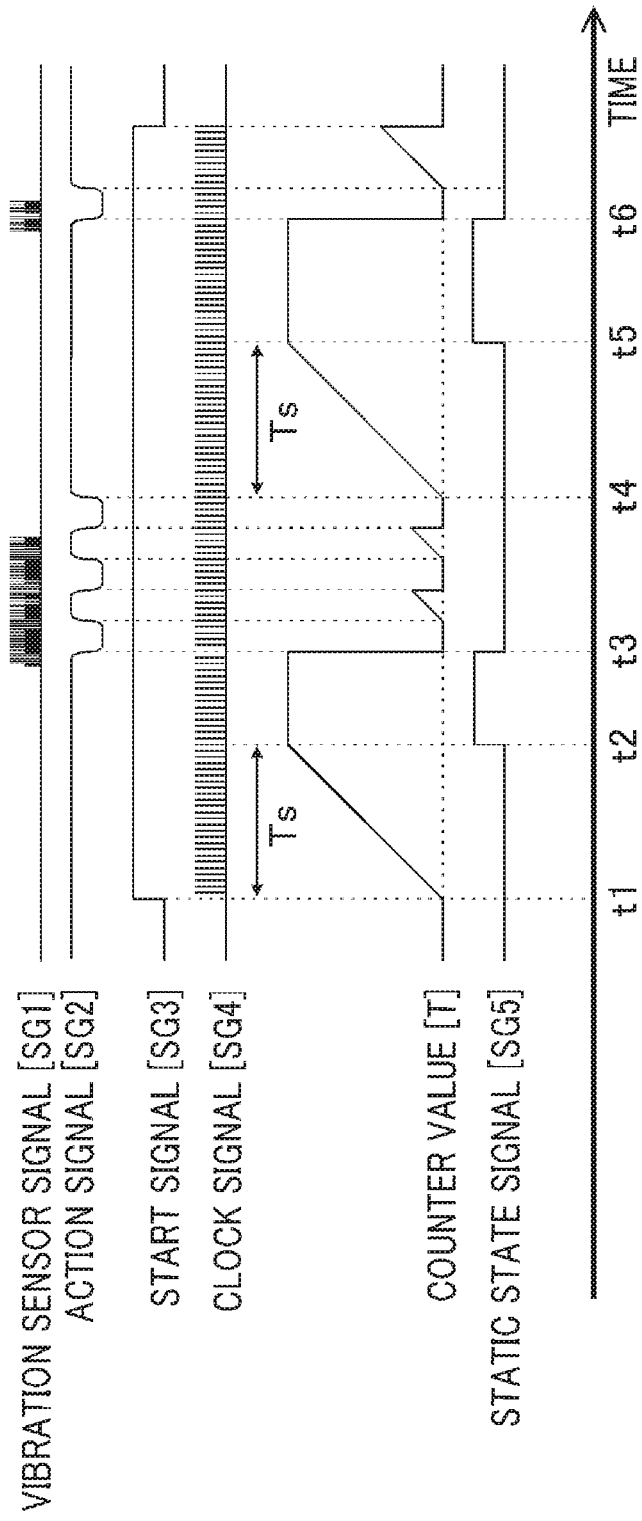
FIG. 7 is a diagram showing timing waveforms for explaining the operations of the action detection section and the static action detection section of the portable device according to Embodiment 1 of the present invention.

The operations of the action detection section 26 and the static action detection section 27 of the portable device 2 according to Embodiment 1 are described with timing waveforms in FIG. 7. In FIG. 7, the horizontal axis represents time. The action detection section 26 performs filtering with a certain time constant on the vibration sensor signal (switch signal SG1) changing between High and Low in accordance with the movement of the portable device 2 to produce the action signal SG2.

When the start signal SG3 is enabled at a time t1, the static action detection section 27 starts the count of pulses of the clock signal SG4 and updates the counter output. When the portable device 2 remains in the static state and the counter value T reaches the static time parameter value Ts at a time t2, the counter operation stops, and the static state signal SG5 indicating the change from the active state to the static state is output.

When the portable device 2 is operated to bring the action signal Low at a time t3, the action signal SG2 is applied to a rest input of the timer counter 271, and thus the counter value T is reset to the initial state. In an example shown by FIG. 7, the time period between the time t2 and the time t3, and the time period between a time t5 and a time t6 are determined to be the static state, during which the static state signal SG5 indicating the static state is output.

The control section 21 of the portable device 2 refers to the static state signal output from the static action detection section 27 when the LF antenna 22 receives the challenge signal, and causes the UHF transmission section 24 and the UHF antenna 25 to transmit the response signal only if the static state has been detected within the predetermined time period. The predetermined time period is a short time period of approximately several seconds immediately before the reception of the challenge signal and is preset and stored in the portable device 2.

Figure 8:
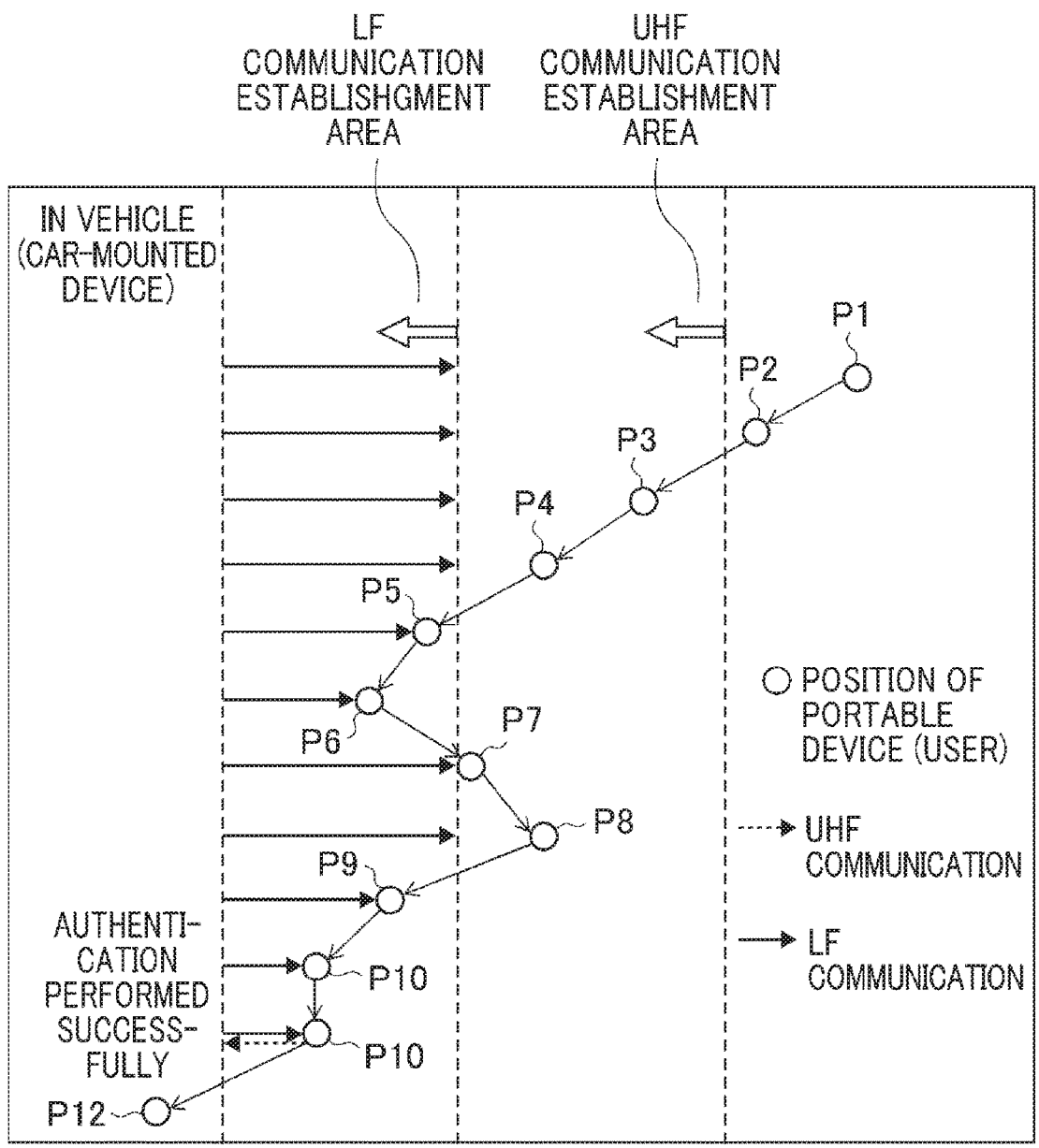
FIG. 8 is a diagram showing a communication sequence performed when a hands-free function is implemented in the keyless system according to Embodiment 1 of the present invention.
Figure 9:
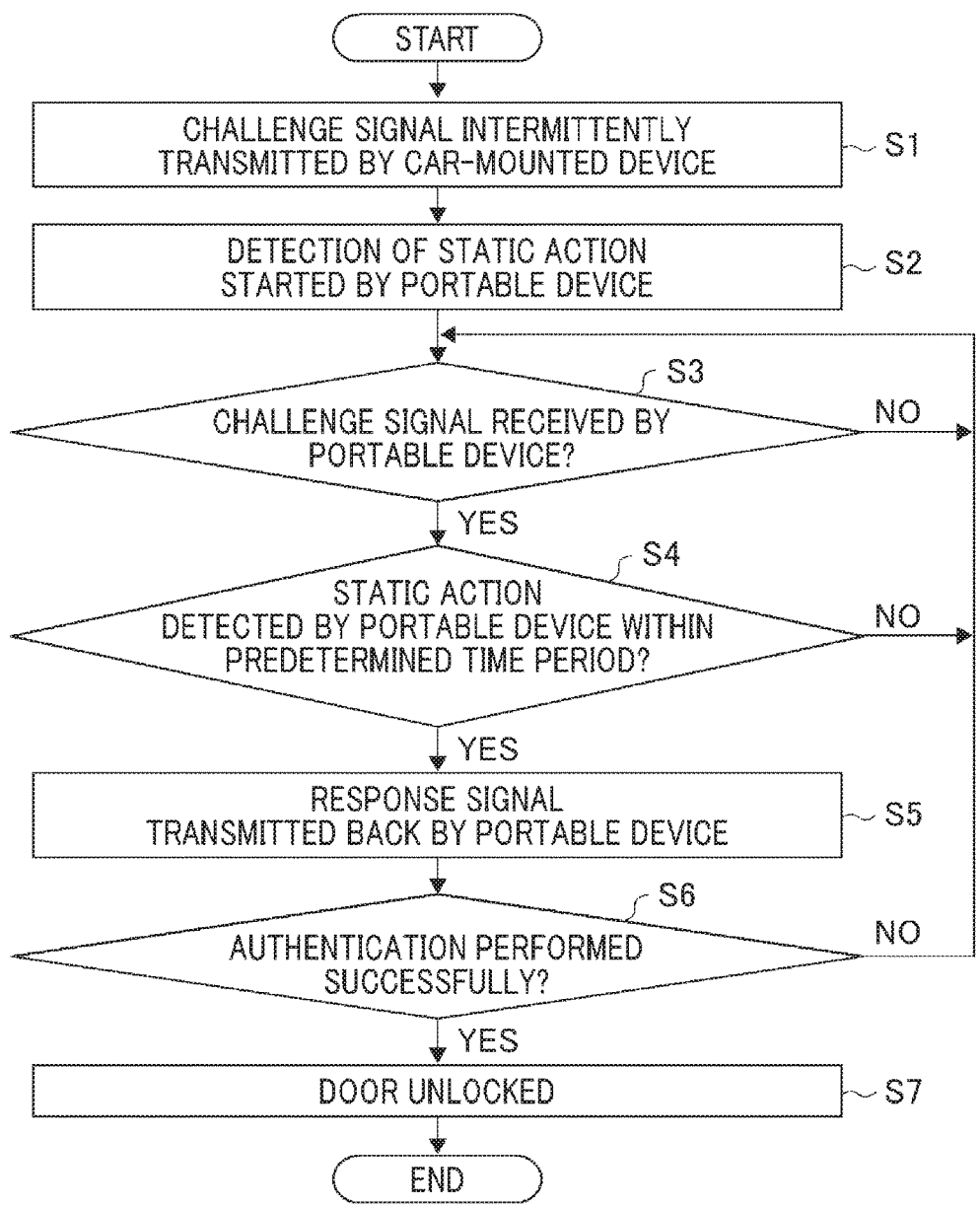
FIG. 9 is a diagram showing the flow of communication control performed when the hands-free function is implemented in the keyless system according to Embodiment 1 of the present invention.

FIG. 8 shows a communication sequence performed when a hands-free function is implemented in the keyless system according to Embodiment 1. In FIG. 8, P1 to P11 indicate positions of the portable device 2 relative to the vehicle 100 having the car-mounted device 1 mounted thereon. FIG. 8 represents changes in positional relationship between the user carrying the portable device 2 and the car-mounted device 1 and how the communication is performed between the car-mounted device 1 and the portable device 2. FIG. 9 shows a flow chart of communication control performed when the hands-free function is used to unlock a door in the keyless system according to Embodiment 1.

Figure 10:
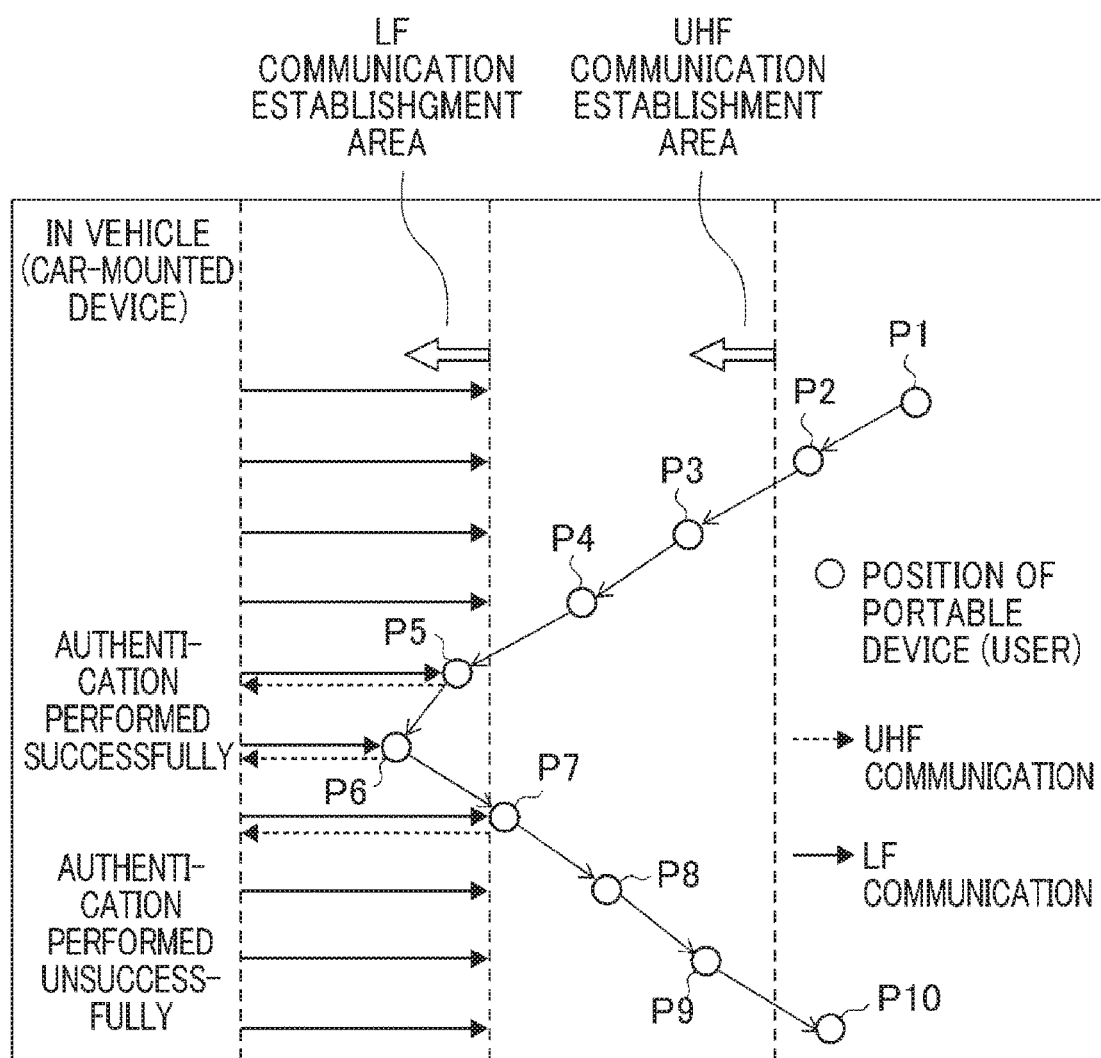
FIG. 10 is a diagram showing a communication sequence performed when a hands-free function is implemented in a conventional keyless system.
Figure 11:
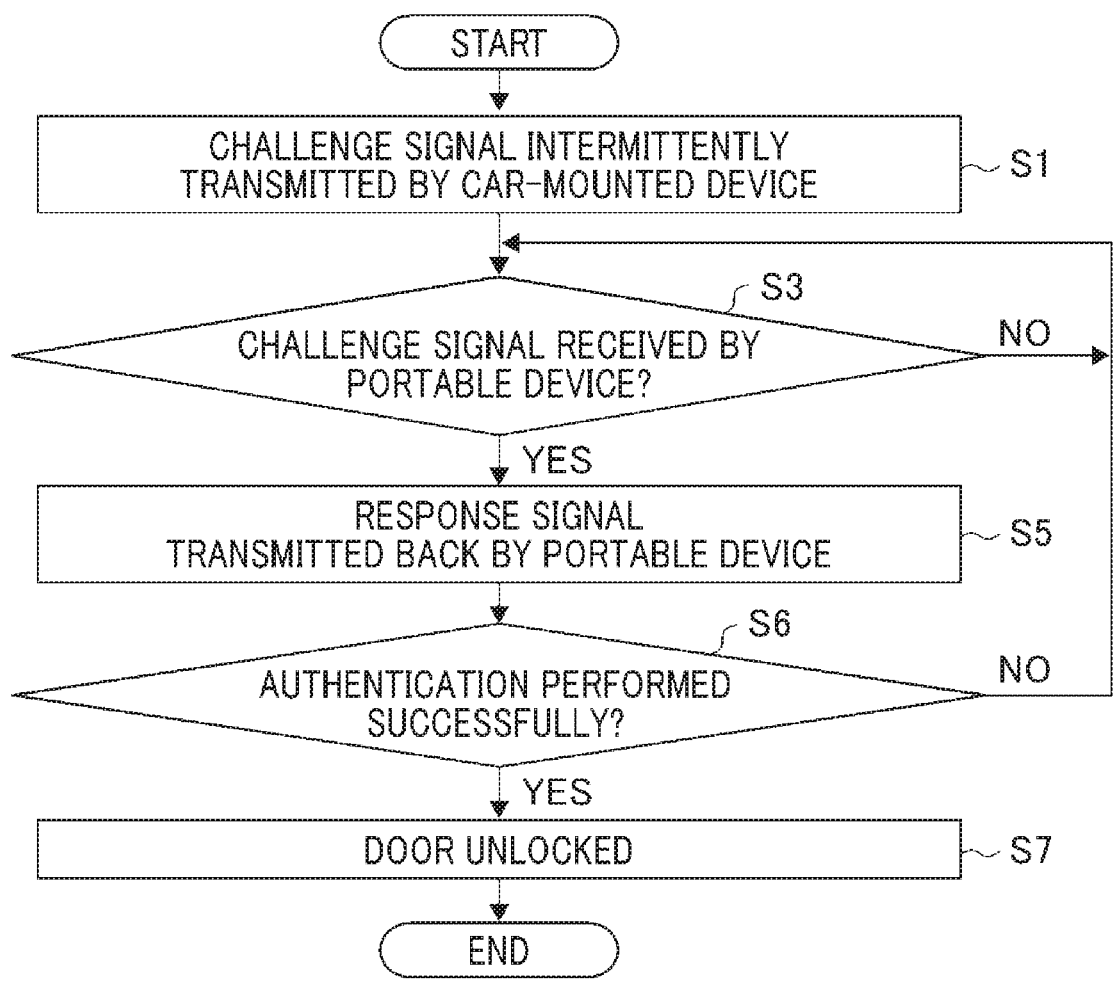
FIG. 11 is a diagram showing the flow of communication control performed when the hands-free function is implemented in the conventional keyless system.

The flow of communication control performed when the hands-free function is implemented in the keyless system according to Embodiment 1 is described with reference to FIG. 8 and FIG. 9. As a comparative example, FIG. 10 and FIG. 11 show an exemplary communication sequence and an exemplary flow chart of communication control performed when a hands-free function is implemented on the basis of a conventional scheme. In the flow charts of FIG. 9 and FIG. 11, the same step number represents the same processing.

First, at step S1 in FIG. 9, the car-mounted device 1 intermittently transmits a challenge signal corresponding to a signal in the LF band. At step S2, the portable device 2 starts detection of a static action. In FIG. 8, when the user stays at any of the positions P1 to P4 outside the LF communication establishment area, the portable device 2 does not make any reaction since the challenge signal does not arrive.

At step S3, the portable device 2 determines whether or not the challenge signal is received from the car-mounted device 1. When the challenge signal is received (YES), the portable device 2 checks whether or not it has detected a static action by the static action detection section 27 within the predetermined time period at step S4. When it is determined that the static action has been detected at step S4 (YES), the portable device 2 transmits back a response signal at step S5.

In FIG. 8, when the user reaches the position P5 or P6 in the LF communication establishment area, the portable device 2 receives the challenge signal from the car-mounted device 1. However, the user is not stationary at the position P5 or P6 but merely passes by, so that it is determined that any static action is not detected at step S4 (NO), and the portable device 2 does not transmit back a response signal. When the user enters the LF communication establishment area again to reach the position P9 and then is stationary at the position P10, it is determined that the static action is detected at step S4 (YES), and the portable device 2 transmits back a response signal at step S5.

Subsequently at step S6, the car-mounted device 1 authenticates the portable device 2 based on the response signal transmitted from the portable device 2, and when the authentication is successfully performed (YES), unlocks the door of the vehicle 100 at step S7 and completes the hands-free function. When the portable device 2 does not receive the challenge signal from the car-mounted device 1 at step S3 (NO) when the portable device 2 does not detect the static action at step S4 (NO), and when the authentication is not successfully performed at step S6 (NO), the control returns to step S3 to repeat the processing described above.

As described above, the keyless system according to Embodiment 1 establishes the communication for authentication only when the user performs the static action with the intention of riding into the vehicle 100. In other words, the static state signal output from the static action detection section 27 of the portable device 2 indicating the static state is a precondition for the establishment of the communication for authentication.

In contrast, in the conventional scheme shown by FIG. 10, when a user carrying the portable device 2 stays at any of the positions P1 to P4 outside the LF communication establishment area, the portable device 2 does not make any reaction since a challenge signal does not arrive. However, when the user reaches a position P5 within the LF communication establishment area, the portable device 2 determines that the challenge signal is received from the car-mounted device 1 at step S3 in FIG. 11, and transmits back a response signal at step S5. When authentication is successfully performed at step S6, the door of the vehicle 100 is unlocked at step S7.

In the example shown by FIG. 10, the user does not perform any static action when he reaches the position P5 within the LF communication establishment area, but the portable device 2 transmits back the response signal. As a result, communication for authentication is established at the position P5 and the door is unlocked. However, the user only approaches the vehicle 100 and does not ride. At the position P8 outside the LF communication establishment area, the communication for authentication is disabled and the door is locked.

As described above, in the conventional scheme, when the user does not intend to ride into the vehicle 100 or moves away from the vehicle 100 without riding, unnecessary door control is performed such as the unlocking of the door of the vehicle 100 when the user enters the LF communication establishment area.

As described above, according to the keyless system of Embodiment 1, the static action detection section 27 of the portable device 2 carried by the user detects the static state of the portable device 2 for the arbitrarily set time period or longer, and the response signal is transmitted on condition that the static action detection section 27 detects the static state. This can realize the hands-free function such as the locking and unlocking of the door of the vehicle 100 through the simple action not requiring action with a user's hand.

Since the natural behavior of the user, that is, the static action, is used, and the time period of the static action can be set arbitrarily, the hands-free function can be realized as appropriate for each user without discomfort. In addition, unnecessary vehicle control not intended by the user can be prevented to reduce the load on a battery for the vehicle 100 and therefore the power consumption.

Some conventional systems include an ultrasonic sensor or an infrared sensor serving as the human detection unit and a motion sensor serving as the action detection unit provided at a plurality of points close to doors of a vehicle. As compared with such conventional systems, the keyless system according to Embodiment 1 realizes a simplified structure with a reduced number of parts and a lower cost. From the above, according to Embodiment 1, the keyless system can be provided with low cost, reduced power consumption, and enhanced convenience.

Embodiment 2

Figure 12:
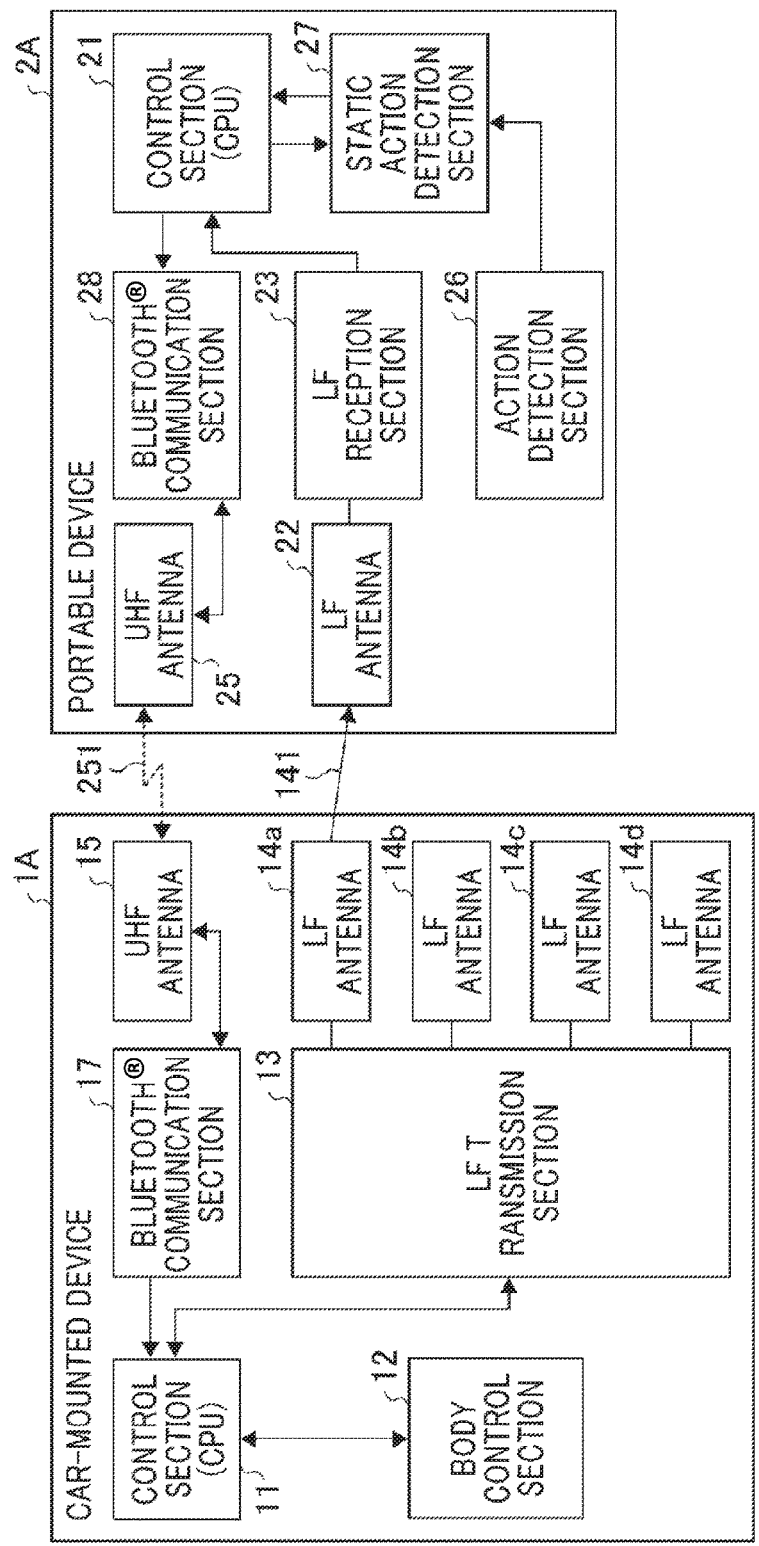
FIG. 12 is a block diagram showing the configurations of a car-mounted device and a portable device in a keyless system according to Embodiment 2 of the present invention.

FIG. 12 is a block diagram showing the configurations of a car-mounted device and a portable device in a keyless system according to Embodiment 2 of the present invention. A car-mounted device 1A of the keyless system according to Embodiment 2 is configured such that the UHF reception section 16 in the car-mounted device 1 (see FIG. 2) according to Embodiment 1 is replaced by a BLUETOOTH®-compatible communication section 17 compliant with the BLUETOOTH® standard, and a first medium- to long-range communication equipment is formed of the BLUETOOTH®-compatible communication section 17 and the UHF antenna 15.

A portable device 2A is configured such that the UHF transmission section 24 in the portable device 2 according to Embodiment 1 is replaced by a BLUETOOTH®-compatible communication section 28, and a second medium- to long-range communication equipment is formed of the BLUETOOTH®-compatible communication section 28 and the UHF antenna 25. Since the other configurations are similar to those in Embodiment 1, description thereof is omitted.

Similarly to Embodiment 1, the keyless system according to Embodiment 2 can implement a hands-free function by using the communication sequence shown in FIG. 8 and the communication control flow chart shown in FIG. 9. Specifically, the control section 21 of the portable device 2A can cause the UHF antenna 25 to transmit a response signal on condition that the static action detection section 27 detects a static state.

In addition, medium- to long-range communication between the car-mounted device 1A and the portable device 2A is provided through the BLUETOOTH® communication capable of bidirectional communication in Embodiment 2, an approximate distance between the portable device 2A and the car-mounted device 1A can be detected on the basis of the status of establishment of bidirectional communication or the intensity of a received signal.

The control section 21 of the portable device 2A may estimate the distance between the portable device 2A and the car-mounted device 1A based on the status of establishment of bidirectional communication with the medium- to long-range communication equipment of the car-mounted device 1A or the intensity of a received signal therefrom, and may cause the UHF antenna 25 to transmit a request signal when the portable device 2A is in the medium- to long-range communication establishment area of the car-mounted device 1A and the static action detection section 27 detects a static state.

According to Embodiment 2, in addition to the similar advantages to those in Embodiment 1, the distance relationship between the car-mounted device 1A and the portable device 2A can be added to the condition for detecting the static action, and the request signal can be transmitted when the portable device 2A is in the medium- to long-range communication establishment area of the car-mounted device 1A, so that this request signal serves as a trigger for communication for authentication. This can reduce the number of transmissions of ineffective challenge signals, thereby reducing power consumption and radio interference with the communication between other vehicles.

Since the standard BLUETOOTH® communication is employed for the medium- to long-range communication, development cost can be reduced to realize the keyless system at a lower cost. In addition, Embodiment 2 can provide the advantage of facilitating an interface with other portable information terminals represented by smartphones.

Embodiment 3

Figure 13:
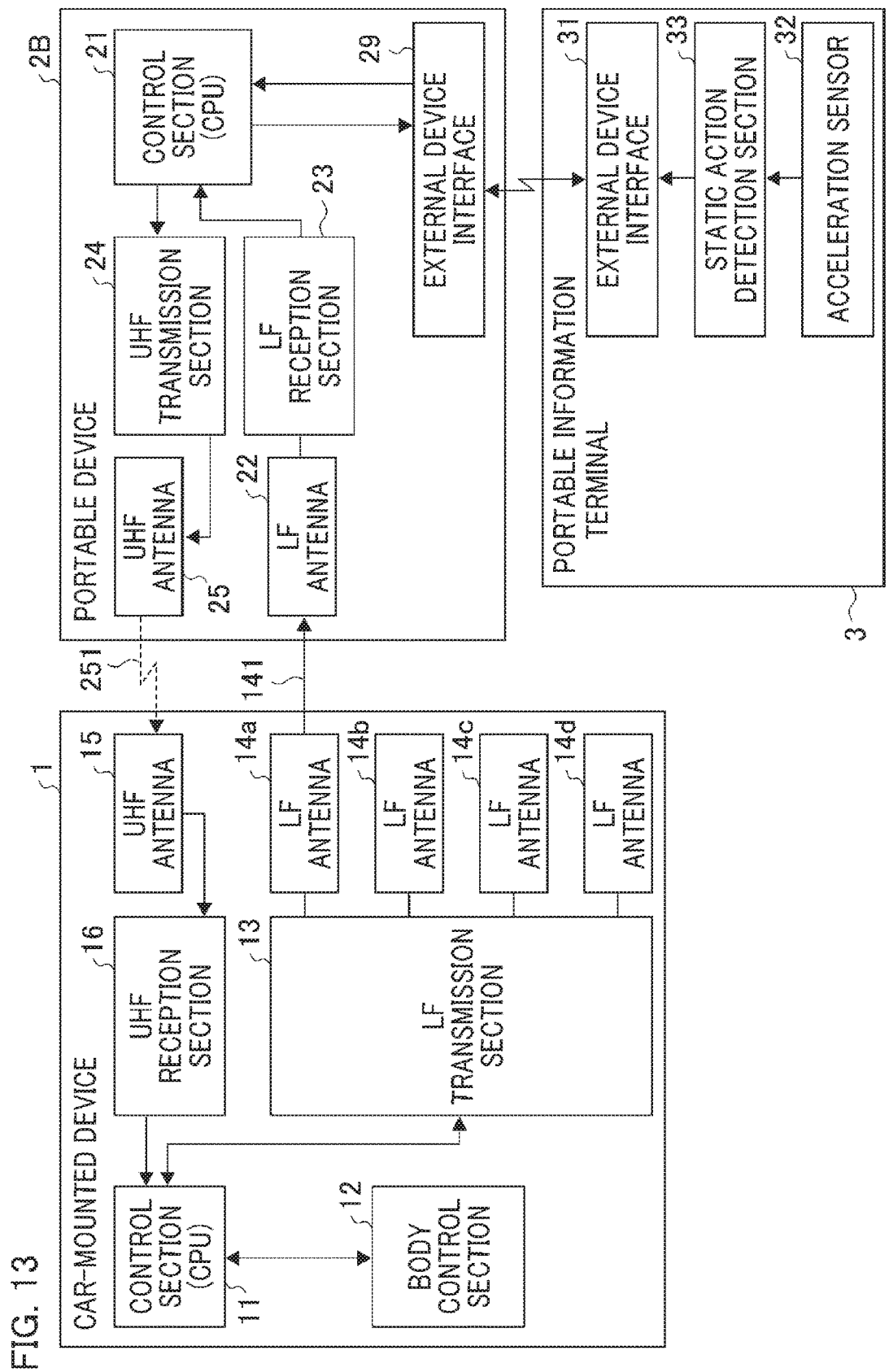
FIG. 13 is a block diagram showing the configurations of a car-mounted device, a portable device, and a portable information terminal in a keyless system according to Embodiment 3 of the present invention.

FIG. 13 is a block diagram showing the configurations car-mounted device, u portable device, and a portable information terminal in a keyless system according to Embodiment 3 of the present invention. The keyless system according to Embodiment 3 is configured to include a car-mounted device 1, a portable device 2B, and a portable information terminal 3. Since the configuration of the car-mounted device 1 according to Embodiment 3 is similar to that of the car-mounted device 1 (see FIG. 2) according to Embodiment 1, description thereof is omitted.

The portable device 273 according to Embodiment 3 differs from the portable device 2 (see FIG. 2) according to Embodiment 1 in that it is configured to include an external device interface 29 serving as a second external device interface and not to include the action detection section 26 and the static action detection section 27. Since the other configurations are similar to those of the portable device 2 according to Embodiment 1, description thereof is omitted.

The portable information terminal 3 includes an external device interface 31 serving as a first external device interface for performing bidirectional communication with the external device interface 29 of the portable device 2A, an acceleration sensor 32, and a static action detection section 33 serving as a static action detector. The acceleration sensor 32 converts an acceleration produced from changes of position of the portable information terminal 3 into an electric signal. The static action detection section 33 detects a static state of the portable information terminal 3 for an arbitrarily set time period or longer based on an acceleration sensor signal output from the acceleration sensor 32.

The external device interface 31 of the portable information terminal 3 and the external device interface 29 of the portable device 2B perform communication according to the BLUETOOTH® standard. The portable information terminal 3 is formed of a smartphone or a tablet which functionally corresponds to a smartphone and is not limited to any particular device.

Figure 14:
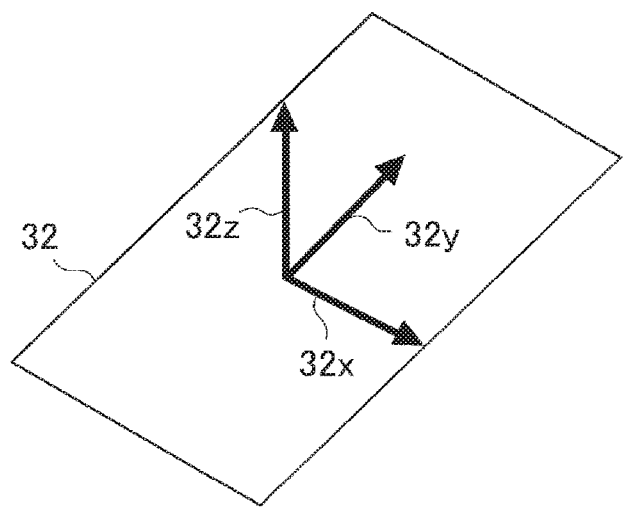
FIG. 14 is a diagram for explaining a three-axis acceleration sensor of a portable information terminal according to Embodiment 3 of the present invention.

As shown in FIG. 14, the acceleration sensor 32 is a three-axis acceleration sensor for detecting an X-axis acceleration 32x, a Y-axils acceleration 32y, and a Z-axis acceleration 32z orthogonal to each other. The acceleration of gravity is detected as three-axis components of X, Y, and Z depending on any inclination of the portable information terminal 3.

Figure 15:
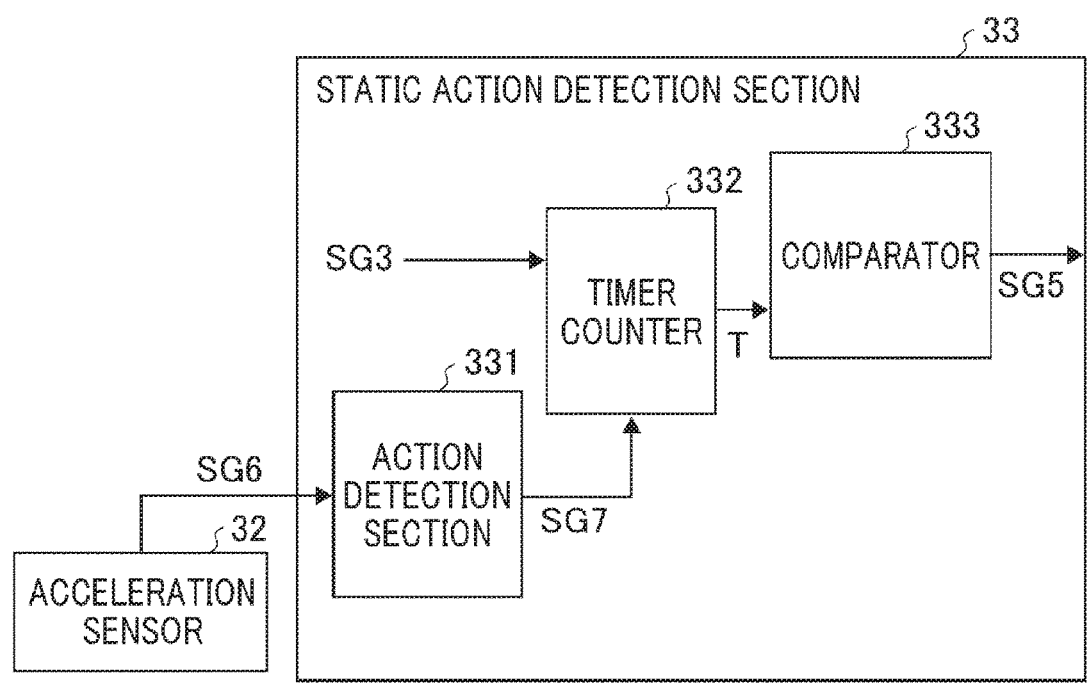

As shown in FIG. 15, the static action detection section 33 of the portable information terminal 3 includes an action detection section 331 serving as an action detection unit, a timer counter 332, and a comparator 333. The action detection section 331 samples a three-axis acceleration sensor signal SG6 of three-axis directions orthogonal to each other output from the acceleration sensor 32 and senses and converts the movement of the portable information terminal 3 from the amount of change in the sampled signal value into an action signal SG7.

The timer counter 332 serving as a time measurement unit starts processing upon instruction of a start signal SG3, measures time by using the action signal SG7 output from the action detection section 331 as a reset signal, and outputs a counter value T. The comparator 333 compares the counter value T measured by the timer counter 332 with a static time parameter value Ts corresponding to the arbitrarily set time period, and when the counter value T exceeds the static time parameter value Ts, determines that the exceeding time corresponds to a static state, and outputs a static state signal SG5 indicating whether or not the portable information terminal 3 is in a static state.

Figure 16:
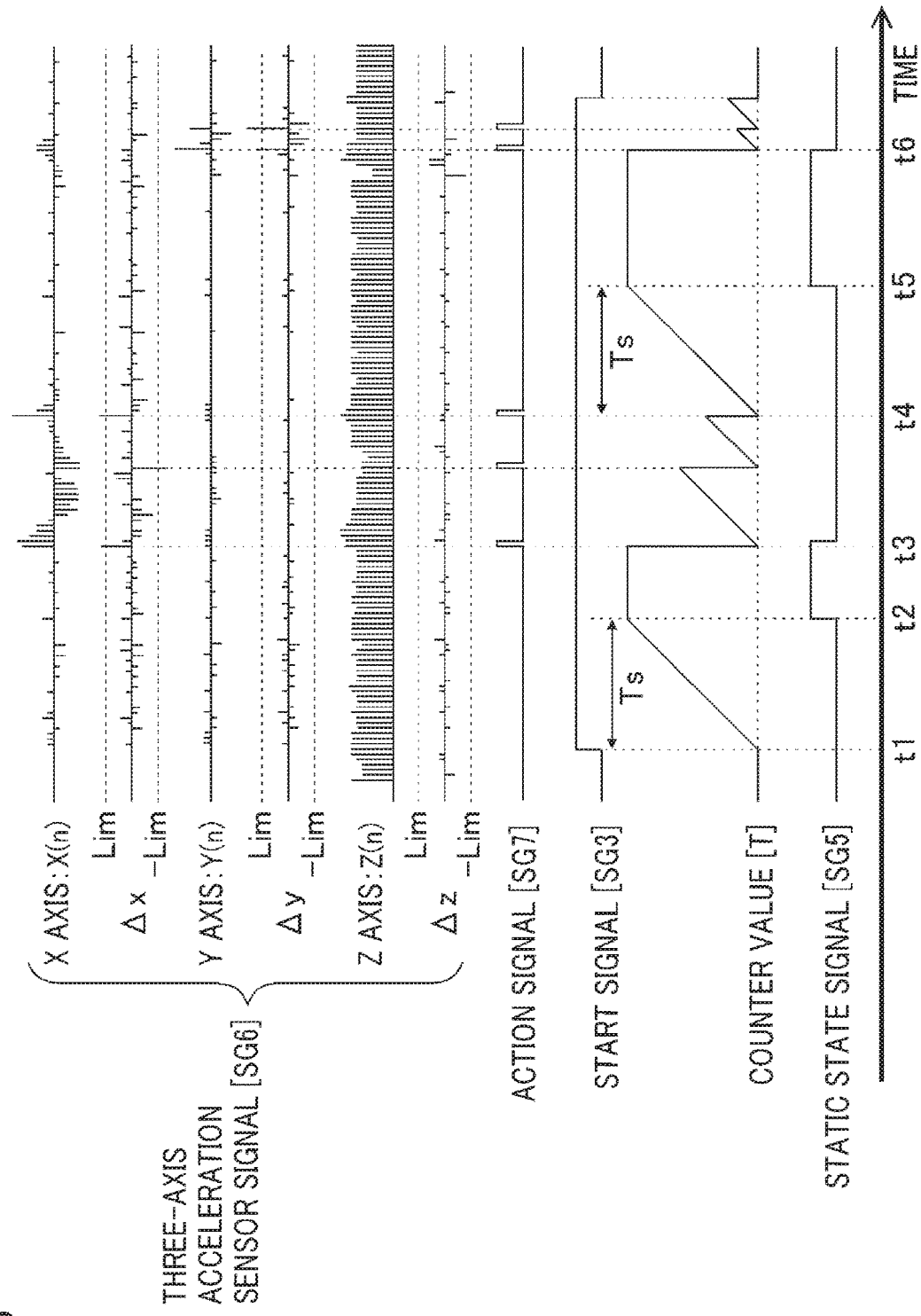
FIG. 16 is a diagram showing timing waveforms for explaining the operations of the three-axis acceleration sensor and the static action detection section of the portable information terminal according to Embodiment 3 of the present invention.

The operations of the acceleration sensor 32 and the static action detection section 33 of the portable information terminal 3 according to Embodiment 3 are described with reference to timing waveforms in FIG. 16. In FIG. 16, the horizontal axis represents time. The acceleration sensor 32 outputs accelerations in the X-axis, Y-axis, and Z-axis directions as digital values (three-axis acceleration sensor signal SG6).

The action detection section 331 receives the input of the acceleration values in the respective axes and calculates a difference in terms of a sampling time n (n=0, 1, 2, 3, . . . ) according to the following expressions 1 to 3. The difference value, that is, the acceleration change amount is calculated to detect the magnitude of movement of the portable information terminal 3.

$$\Delta X(n)=X(n+1)-X(n) \qquad \text{(Expression 1)}$$

$$\Delta Y(n)=Y(n+1)-Y(n) \qquad \text{(Expression 2)}$$

$$\Delta Z(n)=Z(n+1)-Z(n) \qquad \text{(Expression 3)}$$

The acceleration sensor 32 mounted on the portable information terminal 3 has high accuracy and outputs a change amount even from small vibrations. When the user carries the portable information terminal 3, it is often difficult to maintain the terminal 3 in a completely static state. Thus, as shown in FIG. 16, the action detection section 331 sets a movement determination threshold value Lim, and determines that any movement occurs in each axis direction when the Lim is exceeded.

The action detection section 331 outputs the action signal SG7 when any movement occurs in any of the X axis, Y axis, or Z axis. Specifically, the action signal SG7 is "High" if at least one of $|\Delta X(n)|>Lim$, $|\Delta Y(n)|>Lim$, or $|\Delta Z(n)|>Lim$ is satisfied, or "Low" if not.

Since the action signal SG7 is input as the rest signal to the timer counter 332, the counter value T is reset and returns to the initial state when the portable information terminal 3 moves and any pulse is output in the action signal SG7. In the example shown by FIG. 16, when the portable information terminal 3 remains in the static state and the counter value T reaches the static time parameter value Ts at a time t2, the counter operation stops, and the static state signal SG5 indicating the static state is output.

When any pulse is output in the action signal SG7 at a time t3, the counter value T is reset and returns to the initial state. En the example shown by FIG. 16, the time period between the time t2 and the time t3, and the time period between a time t5 and a time t6 are determined to be the static state, during which the static state signal SG5 indicating the static state is output.

Since the communication sequence and the communication control flow chart performed when the hands-free function is implemented in the keyless system according to Embodiment 3 are similar to those in Embodiment 1, description thereof is omitted (see FIG. 8 and FIG. 9). In Embodiment 3, however, the static action detection section 33 of the portable information terminal 33 determines the static action at step S4 in the flow chart of FIG. 9.

According to Embodiment 3, in addition to the similar advantages to those in Embodiment 1, the portable device 2B and the portable information terminal 3 such as a smartphone are connected to each other through the external device interfaces 29 and 31, and the portable information terminal 3 is provided with the acceleration sensor 32 and the static action detection section 33 for detecting the static action of the user, so that the portable device 2E can be simplified in configuration and reduced in size. Since the high-performance acceleration sensor 32 and a fast CPU can be utilized in the portable information terminal 3, the static action of the user can be detected with high accuracy.

Embodiment 4

Figure 17:
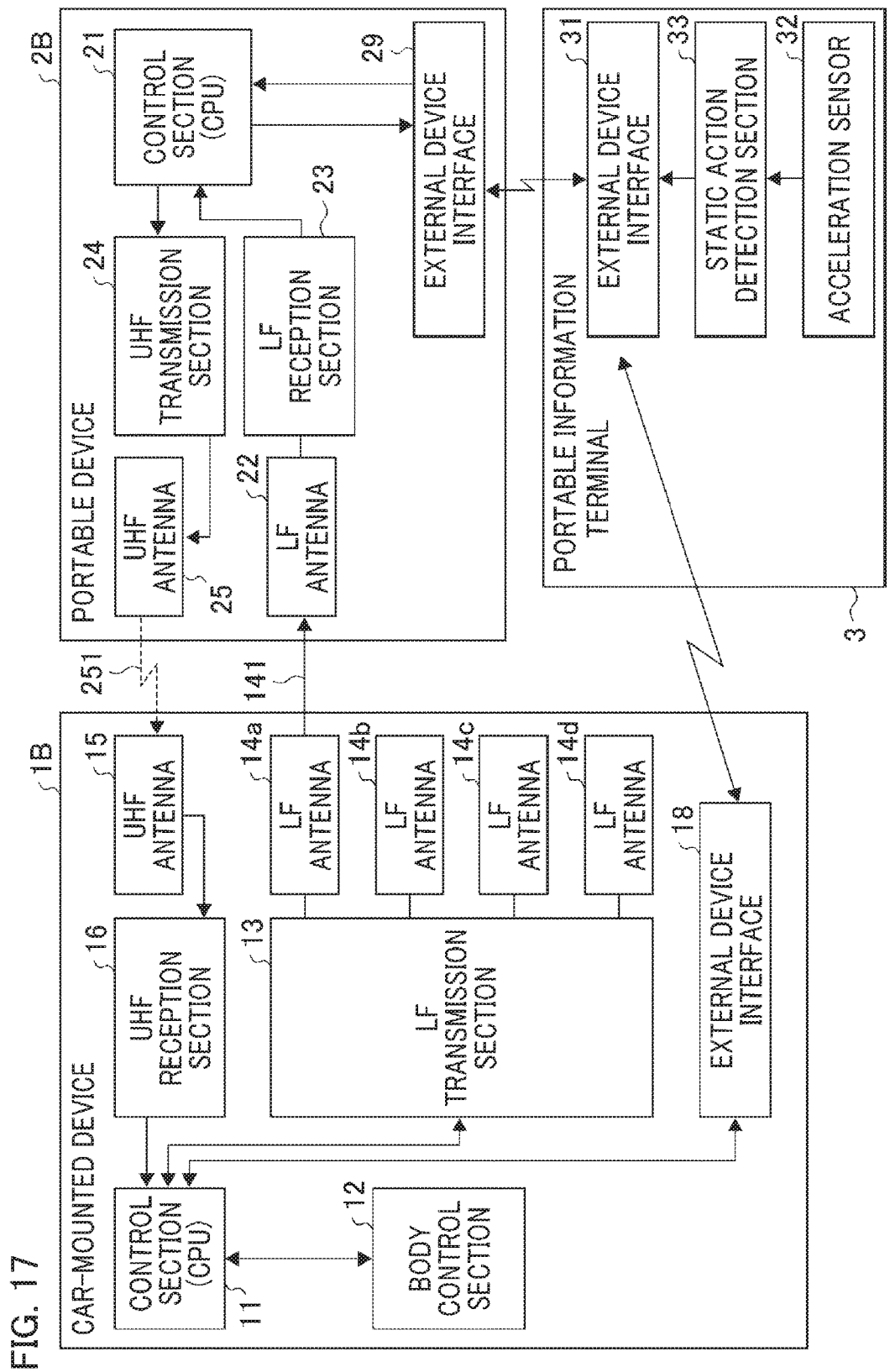
FIG. 17 is a block diagram showing the configurations of a car-mounted device, a portable device, and a portable information terminal in a keyless system according to Embodiment 4 of the present invention.

FIG. 17 is a block diagram showing the configurations of a car-mounted device, a portable device, and a portable information terminal in a keyless system according to Embodiment 4 of the present invention. A car-mounted device is in the keyless system according to Embodiment 4 includes, in addition to the configuration similar to that of the car-mounted device 1 (see FIG. 13) according to Embodiment 3, an external device interface 18 serving as a third external device interface for performing medium- to long-range bidirectional communication with the portable information terminal 3.

Since the configurations of the portable device 2B and the portable information terminal 3 according to Embodiment 4 are similar to those of the portable device 2B and the portable information terminal 3 (see FIG. 13) according to Embodiment 3, and how to detect the static action of the user is similar to that in Embodiment 3, description thereof is omitted.

The external device interface 31 of the portable information terminal 3 performs bidirectional communication with the car-mounted device 1B and the portable device 2B through the external device interface 18 of the car-mounted device 1B and the external device interface 29 of the portable device 2B, respectively. The external device interfaces 18, 29, and 31 of the car-mounted device 1B, the portable device 2B, and the portable information terminal 3 are interfaces for performing medium- to long-range communication according to the BLUETOOTH® standard.

In Embodiment 4, an approximate distance between the car-mounted device 1B and the portable information terminal 3 can be detected on the basis of the status of establishment of bidirectional communication between the external device interface 18 of the car-mounted device 1B and the external device interface 31 of the portable information terminal 3 or the intensity of a received signal. Thus, the general distance relationship between the car-mounted device 1B and the portable device 2B can be added to the condition for detecting the static action.

Specifically, the control section 21 of the portable device 2B estimates the distance between the portable information terminal 3 and the car-mounted device 1B based on the status of establishment of bidirectional communication between the external device interface 31 of the portable information terminal 3 and the external device interface 18 of the car-mounted device 1B or the intensity of a received signal, and causes the UHF antenna 25 to transmit a request signal when the portable information terminal 3 is in the medium- to long-range communication establishment area of the car-mounted device 1B and the static action detection section 33 detects a static state.

Figure 18:
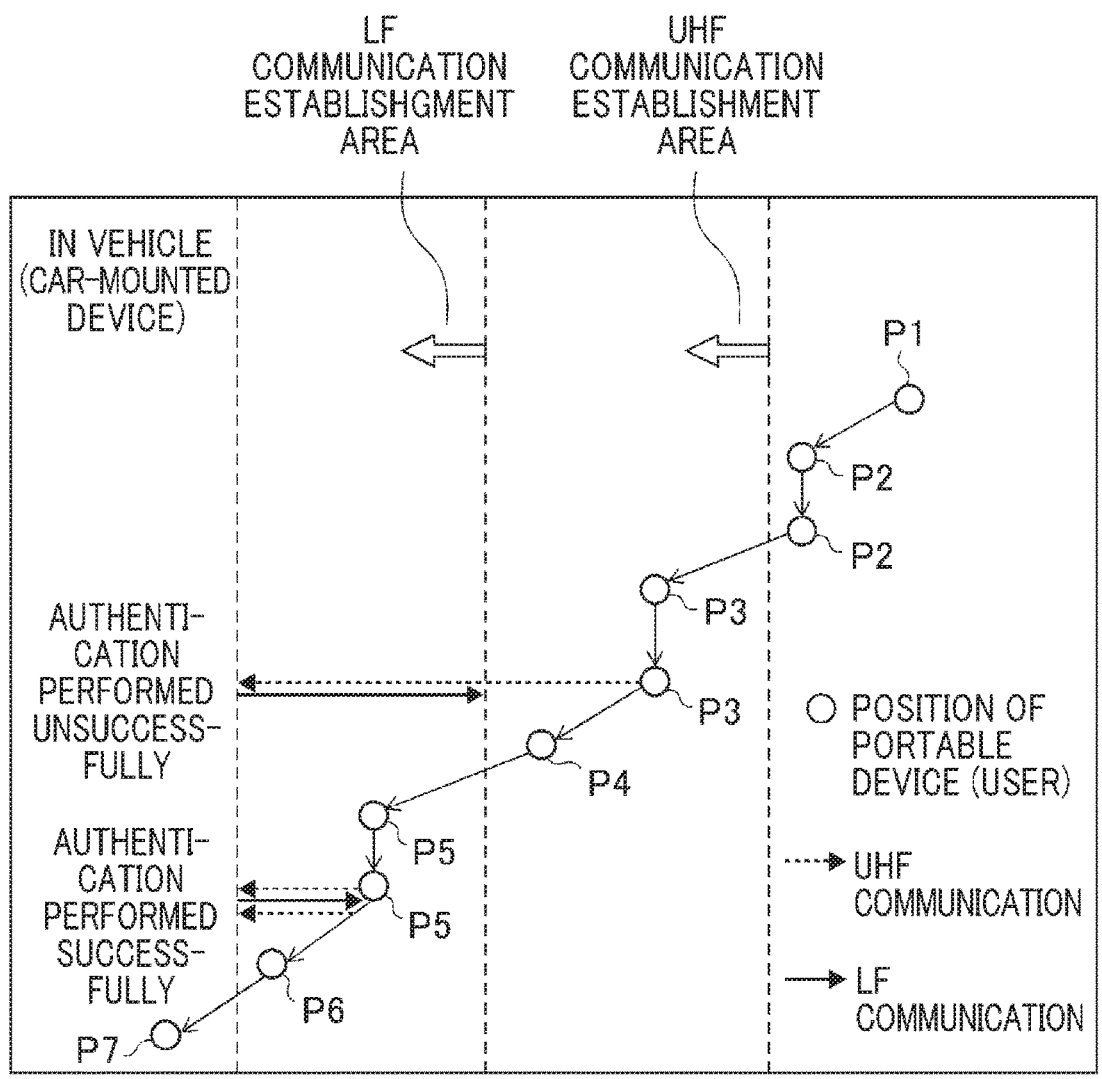
FIG. 18 is a diagram showing a communication sequence performed when a hands-free function is implemented in the keyless system according to Embodiment 4 of the present invention.
Figure 19:
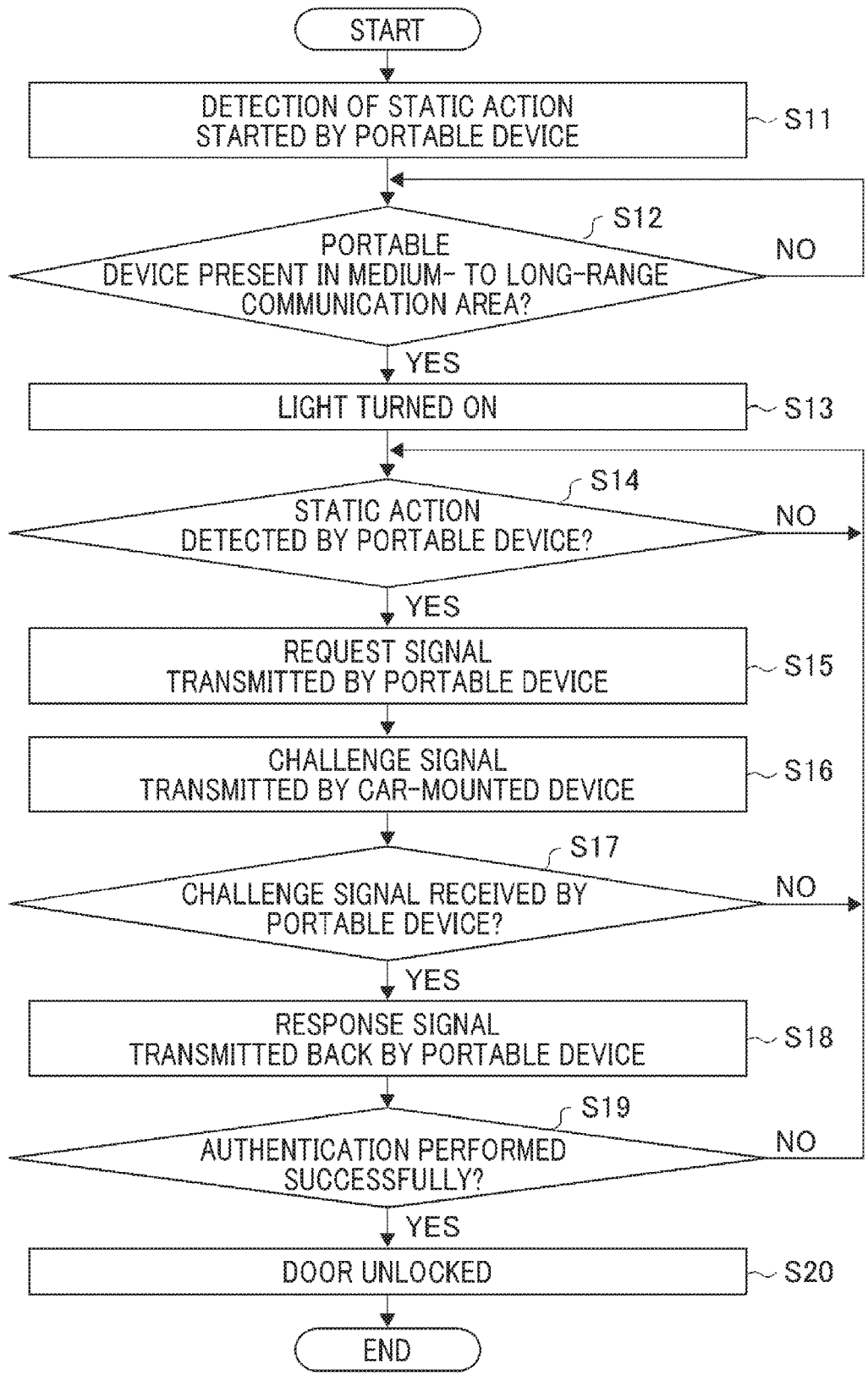
FIG. 19 is a diagram showing the flow of communication control performed when the hands-free function is implemented in the keyless system according to Embodiment 4 of the present invention.

FIG. 18 shows a communication sequence performed when the hands-free function is implemented in the keyless system according to Embodiment 4. In FIG. 18, P1 to P7 indicate positions of the portable device 2B and the portable information terminal 3 relative to the vehicle 100 having the car-mounted device 1B mounted thereon. FIG. 18 represents changes in positional relationship between the user carrying the portable device 2B and the car-mounted device 1B and how the communication is performed between the car-mounted device and the portable device 2B and between the car-mounted device 1B and the portable information terminal 3. FIG. 19 shows a flow chart of communication control performed when the hands-free function is used to unlock a door in the keyless system according to Embodiment 4.

The flow of communication control performed when the hands-free function is implemented in the keyless system according to Embodiment 4 is described with reference to FIG. 18 and FIG. 19. When the hands-free function is started, at step S11 of FIG. 19, the portable device 2B starts detection of a static action. At this point, the car-mounted device 1B does not perform intermittent transmission of a challenge signal. When the user stays at the position P1 or P2 outside the UHF communication establishment area, the portable device 2B performs no operation regardless of the presence or absence of the static action of the user.

Subsequently at step S12, it is checked whether or not the portable device 2B is within the medium- to long-range communication area of the car-mounted device 1B. When it is within the medium- to long-range communication area (YES), the control proceeds to step S13 and the car-mounted device 1B controls turn-on of a light such as an interior light of the vehicle 100. Communication for authentication is not established in this case, and the control details such as the turn-on of the light at step S13 are arbitrarily set. In FIG. 18, when the user approaches the vehicle 100 and reaches the position P3 within the UHF communication establishment area, it is determined that the portable device 2B is within the medium- to long-range communication area.

Subsequently at step S14, the portable device 2B determines from a static state signal output from the static action detection section 33 of the portable information terminal 3 whether or not a static action of the user is detected. When the portable device 2B detects the static state at step S14 (YES), the control proceeds to step S15 and the portable device 2B transmits a request signal for requesting start of authentication through a signal in the UHF band.

Upon reception of the request signal, the car-mounted device 1B transmits a challenge signal through a signal in the LF band to the portable device 2B at step S16. Subsequently at step S17, when the portable device 2B is within the LF communication establishment area and receives the challenge signal (YES), the portable device 2B transmits back a response signal through a signal in the UHF band at step S18.

Subsequently at step S19, the car-mounted device 1B authenticates the portable device 2B based on the response signal transmitted from the portable device 2B, and when the authentication is successfully performed (YES), unlocks a door of the vehicle 100 at step S20 and ends the hands-free function.

When the portable device 2B does not detect the static action at step S14 (NO), when the portable device 2B does not receive the challenge signal from the car-mounted device 1B at step S17 (NO), and when the authentication is not successfully performed at step S19 (NO), the control returns to step S14 to repeat the processing described above.

In FIG. 18, since the user performs the static action at the position P3 within the UHF communication establishment area and outside the LF communication establishment area, the portable device 2B detects the static action with the static action detection section 33 of the portable information terminal 3 and transmits a request signal. Upon reception of the request signal, the car-mounted device 1B transmits a challenge signal, but the portable device 2B cannot receive the challenge signal since it is outside the LF communication establishment area, and thus the authentication is not successfully performed.

When the user further approaches the vehicle 100 and performs the static action at the position P5 within the LF communication establishment area, the portable device 2B detects the static action and transmits a request signal. Then, the portable device 2B receives a challenge signal transmitted by the car-mounted device 1B and transmits back a response signal to perform authentication. When the authentication is successfully performed, the door of the vehicle 100 unlocked.

As described above, in the keyless system according to Embodiment 4, when the portable device 2B is within the medium- to long-range communication area of the car-mounted device 1B and detects the static action of the user, the portable device 2B transmits the request signal for requesting the challenge signal to the car-mounted device 1B, and this request signal serves as a trigger for communication for authentication.

According to Embodiment 4, in addition to the advantages similar to those in Embodiment 3, the car-mounted device 1B does not need to intermittently transmit the challenge signal at all times, and thus the number of transmissions of ineffective challenge signals can be reduced. This can reduce power consumption and radio interference with the communication between other vehicles. Furthermore, since the external device interfaces 18, 29, and 31 perform the standard BLUETOOTH® communication, development cost can be reduced to realize the keyless system at a lower cost.

Embodiment 5

Figure 20:
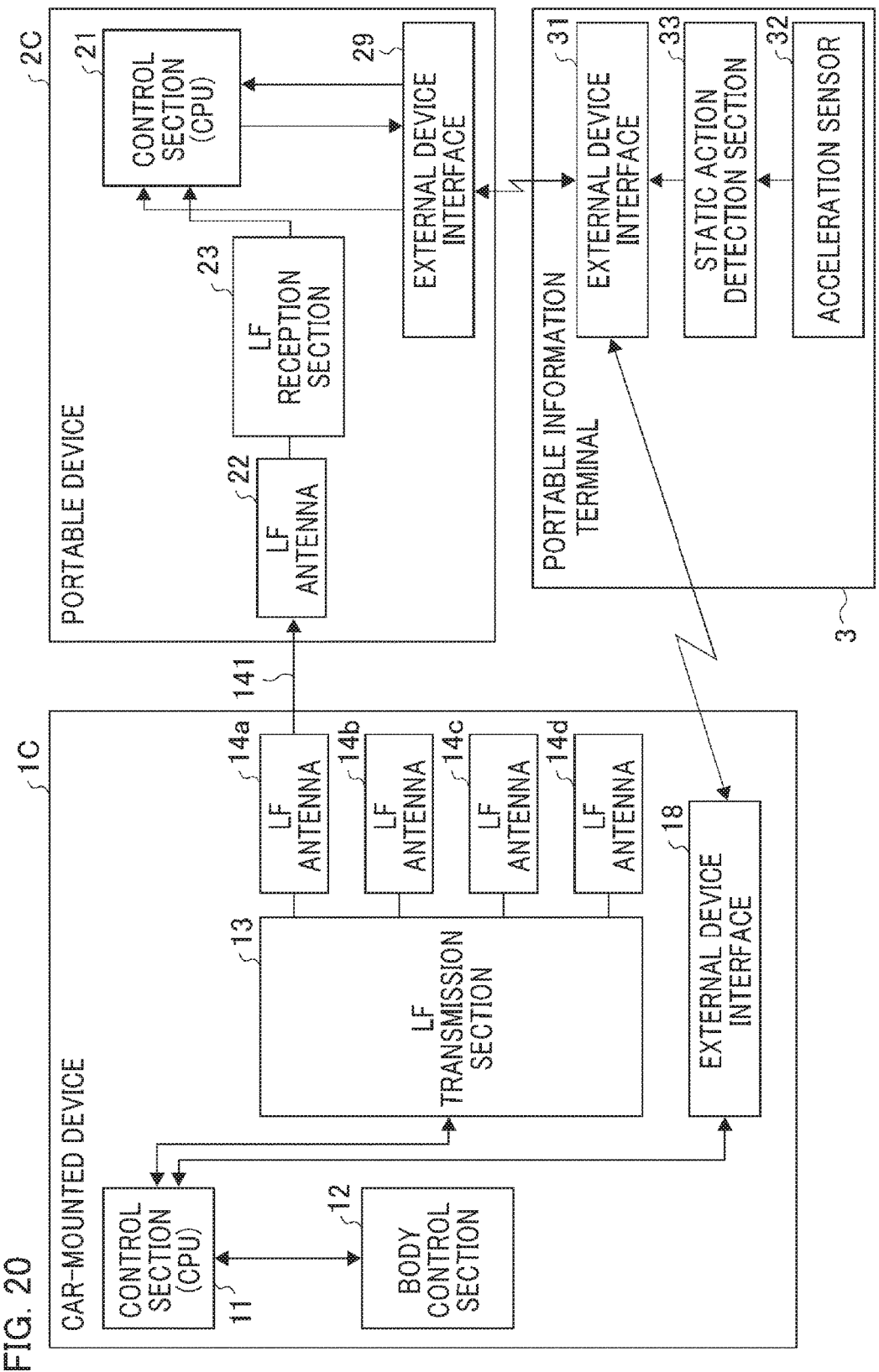
FIG. 20 is a block diagram showing the configurations of a car-mounted device, a portable device, and a portable information terminal in a keyless system according to Embodiment 5 of the present invention.

FIG. 20 is a block diagram showing the configurations of a car-mounted device, a portable device, and a portable information terminal in a keyless system according to Embodiment 5 of the present invention. Although Embodiments 1 to 4 involve the UHF communication performed for the medium- to long-range communication between the car-mounted device 1, 1A, or 1B and the portable device 2, 2A, or 2B, a car-mounted device 1C of the keyless system according to Embodiment 5 performs medium- to long-range communication with the external device interface 31 of the portable information terminal 3 through the external device interface 18.

The car-mounted device 1C according to Embodiment 5 has the configuration in which the UHF antenna 15 and the UHF reception section 17 are omitted from the car-mounted device 1B (see FIG. 17) according to Embodiment 4. The external device interface 18 of the car-mounted device 1C performs bidirectional medium- to long-range communication with at least the external device interface 31 of the portable information terminal 3 out of the portable information terminal 3 and the portable device 2C and receives at least a response signal out of the response signal and a request signal through a medium- to long-range communication signal transmitted from the external device interface 29 of the portable device 2C and the external device interface 31 of the portable information terminal 3.

The portable device 2C has the configuration in which the UHF transmission section 24 and the UHF antenna 25 are omitted from the portable device 2B according to Embodiment 4. The external device interface 29 of the portable device 2C performs bidirectional communication with at least the external device interface 31 of the portable information terminal 3 out of the portable information terminal 3 and the car-mounted device 1C. The external device interfaces 18, 29, and 31 of the car-mounted device 1C, the portable device 2C, and the portable information terminal 3 perform communication according to the BLUETOOTH® standard, but the communication scheme is not particularly limited.

In the keyless system according to Embodiment 5, the portable device 2C does not include the UHF transmission section 24 and the UHF antenna 25, the portable information terminal 3 may perform communication for authentication with the car-mounted device 1C. Specifically, the external device interface of the portable information terminal 3 may transmit a request signal for requesting a challenge signal from the car-mounted device 1C and a response signal serving as a response to the challenge signal.

The control section 21 of the portable device 2C acquires the result of detection by the static action detection section 33 of the portable information terminal 3 through the external device interfaces 29 and 31, and causes the external device interface 29 or 31 to transmit a request signal or a response signal on condition that a static state is detected within a predetermined time period.

Since how to detect the static action of the user in the portable information terminal 3 is similar to that in Embodiment 3, description thereof is omitted (see FIG. 16). The communication sequence and the communication control flow chart performed when the hands-free function is implemented in Embodiment 5 are almost similar to those in Embodiment 4 (see FIG. 18 and FIG. 19).

In Embodiment 5, however, the control section 21 of the portable device 2C estimates the distance between the portable information terminal 3 or the portable device 2C and the car-mounted device 1C based on the status of establishment of bidirectional communication between the external device interface 31 of the portable information terminal 3 or the external device interface 29 of the portable device 2C and the external device interface 18 of the car-mounted device 1C or the intensity of a received signal therefrom. Since both the portable information terminal 3 and the portable device 2C are carried by the user, the distance between the portable information terminal 3 and the car-mounted device 1C is considered as being the same as the distance between the portable device 2C and the car-mounted device 1C.

According to Embodiment 5, the similar advantages to those in Embodiment 4 can be provided, and the external device interfaces 18 and 29 are used as the medium- to long-range communication unit in the car-mounted device 1C and the portable device 2C to omit the UHF communication sections, so that the configurations of the car-mounted device 1C and the portable device 2C are simplified to reduce the cost. It should be noted that the embodiments may be combined freely or modified or omitted as appropriate without departing from the spirit or scope of the present invention.

Various modifications and alterations of this invention will be apparent to those skilled in the art without departing from the scope and spirit of this invention, and it should be understood that this is not limited to the illustrative embodiments set forth herein.

What is claimed is:

1. A keyless system comprising a car-mounted device mounted on a vehicle and a portable device carried by a user, the keyless system configured to perform communication for authentication between the car-mounted device and the portable device to perform vehicle control including locking and unlocking of a door of the vehicle, wherein the car-mounted device includes a first close-range communication equipment configured to transmit a challenge signal in a low frequency (LF) band, a first medium- to long-range communication equipment configured to receive a ultra high frequency (UHF) signal in a UHF band transmitted by the portable device, and a first processor configured to authenticate the portable device based on the UHF signal that is received by the first medium- to long-range communication equipment in response to the challenge signal, and the portable device includes a second close-range communication equipment configured to receive the challenge signal transmitted by the first close-range communication equipment, a second medium- to long-range communication equipment configured to transmit the UHF signal to the car-mounted device in response to the challenge signal, an action detector configured to sense and convert a change of a position of the portable device into an electric signal, a static action detector configured to count a number of clock signal pulses until the change of the position is detected, and determine that the portable device is in a static state during a time period from a first time when the counted number of clock signal pulses reaches a predetermined value to a second time when the electric signal indicating the change of the position is output from the action detector, and a second processor configured to cause the second medium- to long-range communication equipment to transmit the UHF signal in response to the challenge signal when the portable device is determined as being in the static state.

2. The keyless system according to claim 1, wherein the action detector includes a vibration sensor including a switch configured to change a signal path between a connection state and a disconnection state in response to vibrations of the portable device and is configured to convert a vibration sensor signal output by the vibration sensor into the electrical signal to indicate an action state of the portable device.

3. The keyless system according to claim 1, wherein the action detector includes an acceleration sensor configured to convert an acceleration produced from the change of the position of the portable device into the electric signal and is configured to sense a movement of the portable device from an amount of change in a value of an acceleration sensor signal output from the acceleration sensor and to convert the acceleration sensor signal into the electrical signal to indicate an action state of the portable device.

4. The keyless system according to claim 2, wherein the static action detector is configured to measure time by using the electrical signal output from the action detector as a reset signal, and to compare measured time with a predetermined time period, and when the measured time exceeds the predetermined time period, to determine that the portable device is in the static state, and output a static state signal indicating that the portable device is in the static state.

5. The keyless system according to claim 1, wherein the second processor is configured to cause the second medium- to long-range communication equipment to transmit the UHF signal only if the static state is detected within a predetermined time period.

6. The keyless system according to claim 1, wherein the first medium- to long-range communication equipment and the second medium- to long-range communication equipment are configured to perform communication with each other according to BLUETOOTH® standard.

7. The keyless system according to claim 6, wherein the second processor is configured to estimate a distance between the portable device and the car-mounted device based on a status of establishment of bidirectional communication of the second medium- to long-range communication equipment with the first medium- to long-range communication equipment or an intensity of a received signal therefrom, and to cause the second medium- to long-range communication equipment to transmit the UHF signal when the portable device is in a medium- to long-range communication establishment area of the car-mounted device and the static action detector detects the static state.

8. A keyless system comprising a car-mounted device mounted on a vehicle, and a portable information terminal and a portable device both carried by a user, the keyless system configured to perform communication for authentication among the car-mounted device, the portable information terminal, and the portable device to perform vehicle control including locking and unlocking of a door of the vehicle,
wherein the car-mounted device includes a first close-range communication equipment configured to transmit a challenge signal in a low frequency (LF) band, a first medium- to long-range communication equipment configured to receive a ultra high frequency (UHF) signal in a UHF band, and a first processor configured to authenticate the portable device based on the UHF signal that is received by the first medium- to long-range communication equipment in response to the challenge signal,
the portable information terminal includes a first external device interface configured to perform bidirectional communication with the portable device, an acceleration sensor configured to convert an acceleration produced from a change of a position of the portable information terminal into an electric signal, and a static action detector configured to count a number of clock signal pulses until the chance of the position is detected, and determine that the portable information terminal is in a static state during a time period from a first time when the counted number of clock signal pulses reaches a predetermined value to a second time when the electric signal indicating the change of the position is output from the acceleration sensor, and
the portable device includes a second external device interface configured to perform bidirectional communication with the portable information terminal, a second close-range communication equipment configured to receive the challenge signal transmitted by the first close-range communication equipment, a second medium- to long-range communication equipment configured to transmit the UHF signal to the car-mounted device in response to the challenge signal, and a second processor configured to acquire a determination result indicating the static state of the portable information terminal through the first external device interface and the second external device interface, and to cause the second medium- to long-range communication equipment to transmit the UHF signal in response to the static state being within a predetermined time period.

9. The keyless system according to claim 8, wherein the static action detector of the portable information terminal is configured to sense a movement of the portable information terminal from an amount of change in a value of an acceleration sensor signal of three-axis directions orthogonal to each other output from the acceleration sensor and to convert the acceleration sensor signal into an action signal, and to measure time by using the action signal as a reset signal, and to compare measured time with another predetermined time period, and when the measured time exceeds the other predetermined time period, to determine that the portable information terminal is in the static state and output a static state signal indicating that the portable information terminal is in the static state.

10. The keyless system according to claim 9, wherein the second processor is configured to cause the second medium- to long-range communication equipment or the second external device interface or the first external device interface to transmit the UHF signal only if the static state is detected within the predetermined time period.

11. The keyless system according to claim 8, wherein the first external device interface and the second external device interface are configured to perform communication with each other according to BLUETOOTH® standard.

12. The keyless system according to claim 8, wherein the car-mounted device includes a third external device interface configured to perform bidirectional medium- to long-range communication with the portable information terminal.

13. The keyless system according to claim 12, wherein the first external device interface, the second external device interface, and the third external device interface are configured to perform communication with each other according to the BLUETOOTH® standard.

14. The keyless system according to claim 12, wherein the second processor is configured to estimate a distance between the portable information terminal and the car-mounted device based on a status of establishment of bidirectional communication of the first external device interface with the third external device interface or the intensity of a received signal therefrom, and to cause the second medium- to long-range communication equipment to transmit the request signal when the portable information terminal is in a medium- to long-range communication establishment area of the car-mounted device and the static action detector detects the static state.

15. A keyless system comprising a car-mounted device mounted on a vehicle, and a portable information terminal and a portable device both carried by a user, the keyless system configured to perform communication for authentication between the car-mounted device and the portable information terminal to perform vehicle control including locking and unlocking of a door of the vehicle,
wherein the car-mounted device includes a first close-range communication equipment configured to transmit a challenge signal in a low frequency (LF) band, a third external device interface configured to perform bidirectional medium- to long-range communication with the portable information terminal and to receive a ultra high frequency (UHF) signal in a UHF band from the portable device or the portable information terminal, and a first processor configured to authenticate the portable device based on the UHF signal received by the third external device interface,
the portable information terminal includes a first external device interface configured to perform bidirectional communication with the car-mounted device and the portable device, an acceleration sensor configured to convert an acceleration produced from a change of a position of the portable information terminal into an electric signal, and a static action detector configured to count a number of clock signal pulses until the change of the position is detected, and determine that the portable information terminal is in a static state during a time period from a first time when the counted number of clock signal pulses reaches a predetermined value to a second time when the electric signal indicating the change of the position is output from the acceleration sensor, and
the portable device includes a second external device interface configured to perform bidirectional communication with the portable information terminal, a second close-range communication equipment configured to receive the challenge signal transmitted by the car-mounted device, and a second processor configured to acquire a determination result indicating the static state of the portable information terminal through the first external device interface and the second external device interface, and to cause the second external device interface or the first external device interface to transmit the UHF signal in response to the static state being detected within a predetermined time period.

16. The keyless system according to claim 15, wherein the first external device interface, the second external device interface, and the third external device interface are configured to perform communication with each other according to BLUETOOTH® standard.

17. The keyless system according to claim 15, wherein the static action detector of the portable information terminal is configured to sense a movement of the portable information terminal from an amount of change in a value of an acceleration sensor signal of three-axis directions orthogonal to each other output from the acceleration sensor and to convert the acceleration sensor signal into an action signal, and to measure time by using the action signal as a reset signal, and to compare measured time with another predetermined time period, and when the measured time exceeds the other predetermined time period, to determine that the portable information terminal is in to the static state and output a static state signal indicating that the portable information terminal is in the static state.

18. The keyless system according to claim 17, wherein the second processor is configured to cause the second external device interface or the first external device interface to transmit the UHF signal only if the static state is detected within the predetermined time period.

19. The keyless system according to claim 15, wherein the second processor is configured to estimate a distance between the portable information terminal or the portable device and the car-mounted device based on a status of establishment of bidirectional communication of the first external device interface or the second external device interface with the third external device interface or an intensity of a received signal therefrom, and to cause the first external device interface or the second external device interface to transmit the UHF signal when the portable information terminal or the portable device is in a medium- to long-range communication establishment area of the car-mounted device and the static action detector detects the static state.

* * * * *